United States Patent [19]

Iwagaki

[11] Patent Number: 5,376,484
[45] Date of Patent: Dec. 27, 1994

[54] PHOTOGRAPHIC INFORMATION RECORDING METHOD

[75] Inventor: Masaru Iwagaki, Hino, Japan

[73] Assignee: Konica Corporation, Tokyo, Japan

[21] Appl. No.: 113,738

[22] Filed: Aug. 30, 1993

[30] Foreign Application Priority Data

Sep. 1, 1992 [JP] Japan ................... 4-233810

[51] Int. Cl.$^5$ ............................................. G03C 11/02
[52] U.S. Cl. ..................................... 430/21; 430/553; 354/106
[58] Field of Search .......................... 430/21, 503, 553; 354/105, 106; 355/41

[56] References Cited

U.S. PATENT DOCUMENTS

| | | | |
|---|---|---|---|
| 2,369,929 | 2/1945 | Vittum et al. | 95/6 |
| 2,474,293 | 6/1949 | Weissburger et al. | 95/6 |
| 2,698,794 | 1/1955 | Godowsky | 95/2 |
| 2,772,162 | 11/1956 | Salminen et al. | 96/55 |
| 2,810,171 | 10/1957 | Brooks et al. | 24/81 |
| 2,895,926 | 7/1959 | Rappaport et al. | 260/2.5 |
| 3,061,432 | 10/1962 | Menzel et al. | 96/55 |
| 3,446,622 | 5/1969 | Magagnoli et al. | 96/55 |
| 3,451,820 | 6/1969 | Umberger | 96/100 |
| 3,476,563 | 11/1969 | Loria | 96/100 |
| 3,574,628 | 4/1971 | Jones | 96/107 |
| 3,665,394 | 5/1972 | Lender et al. | 340/146.1 A X |
| 3,725,067 | 4/1973 | Bailey et al. | 96/56.5 |
| 3,749,735 | 7/1973 | Loria | 260/326 N |
| 3,758,308 | 9/1973 | Beavers et al. | 96/100 |
| 3,772,002 | 11/1973 | Ramello | 96/100 |
| 3,933,051 | 1/1976 | Ringwall | 74/5.6 B |
| 3,968,505 | 7/1976 | Kauneckas | 354/105 |
| 4,004,929 | 1/1977 | Orvis | 96/100 |
| 4,022,620 | 5/1977 | Okumura et al. | 96/56.2 |

(List continued on next page.)

FOREIGN PATENT DOCUMENTS

| | | |
|---|---|---|
| 2318437 | 2/1977 | France . |
| 60-212749 | 10/1985 | Japan . |
| 3-041427 | 2/1991 | Japan . |
| 3-041428 | 2/1991 | Japan . |
| 4-315136 | 11/1992 | Japan . |
| 5-045717 | 2/1993 | Japan . |

Primary Examiner—Charles L. Bowers, Jr.
Assistant Examiner—John A. McPherson
Attorney, Agent, or Firm—Finnegan, Henderson, Farabow, Garrett & Dunner

[57] ABSTRACT

A method for photographically recording an information pattern on a photographic film is disclosed. The method comprises the steps of (1) writing an information pattern at an area outside the picture taking area of a silver halide color photographic film with a red-light having an intensity peak at a wavelength of 620 nm or more emitted from a photoemission diode, (2) processing the color photographic film, and (3) optically reading an image of the pattern formed on the color photographic film with red-light having a intensity peak a wavelength of 620 nm or above. In the method, a red-sensitive silver halide emulsion layer of the color photographic film contains a coupler represented by the following Formula CU;

wherein X is a substituent capable of splitting-off upon reaction with the oxidation product of an aromatic primary amine color developing agent; $R^1$ is an aryl group or a heterocyclic group; $R^2$ is a an aliphatic group or an aryl group; and the above groups represented by $R^1$ or $R^2$ each may have a substituent.

9 Claims, 7 Drawing Sheets

OPTICAL RECORDING AREA

MAGNETIC RECORDING AREA

U.S. PATENT DOCUMENTS

| Patent No. | Date | Inventor | Class |
|---|---|---|---|
| 4,080,211 | 3/1978 | Van Paesschen et al. | 96/119 R |
| 4,130,427 | 12/1978 | Monbaliu et al. | 96/56.5 |
| 4,138,258 | 2/1979 | Hirose et al. | 96/74 |
| 4,163,670 | 8/1979 | Shiba et al. | 96/74 |
| 4,228,233 | 10/1980 | Yagihara et al. | 430/385 |
| 4,248,961 | 2/1981 | Hagen et al. | 430/381 |
| 4,248,962 | 2/1981 | Lau | 430/382 |
| 4,254,212 | 3/1981 | Yagihara et al. | 430/381 |
| 4,283,472 | 8/1981 | Gompf et al. | 430/17 |
| 4,296,199 | 10/1981 | Yagihara et al. | 430/551 |
| 4,296,200 | 10/1981 | Yagihara et al. | 430/551 |
| 4,310,618 | 1/1982 | Fernandez et al. | 430/381 |
| 4,310,619 | 1/1982 | Ichijima et al. | 430/387 |
| 4,314,023 | 2/1982 | Kojima et al. | 430/389 |
| 4,326,024 | 8/1982 | Kobayashi et al. | 430/557 |
| 4,327,173 | 4/1982 | Aoki et al. | 430/505 |
| 4,333,999 | 6/1982 | Lau | 430/17 |
| 4,334,011 | 6/1982 | Aoki et al. | 430/552 |
| 4,338,393 | 7/1982 | Bailey et al. | 430/386 |
| 4,351,897 | 9/1982 | Aoki et al. | 430/555 |
| 4,366,237 | 12/1982 | Ichijima et al. | 430/505 |
| 4,367,282 | 1/1983 | Yagihara et al. | 430/381 |
| 4,401,752 | 8/1983 | Lau | 430/385 |
| 4,409,320 | 10/1983 | Yagihara et al. | 430/381 |
| 4,411,987 | 10/1983 | Kobayashi et al. | 430/542 |
| 4,427,767 | 1/1984 | Aoki et la. | 430/552 |
| 4,435,503 | 3/1984 | Mihoyashi et al. | 430/584 |
| 4,451,559 | 5/1984 | Sato et al. | 430/552 |
| 4,453,814 | 6/1984 | Satoh et al. | 354/107 |
| 4,500,630 | 2/1985 | Sato et al. | 430/386 |
| 4,511,649 | 4/1985 | Ogawa et al. | 430/553 |
| 4,540,654 | 9/1985 | Sato et al. | 430/381 |
| 4,553,477 | 11/1985 | Witczak | 101/365 |
| 4,556,630 | 12/1985 | Furutachi et al. | 430/372 |
| 4,576,910 | 3/1986 | Hirano et al. | 430/548 |
| 4,690,889 | 9/1987 | Saito et al. | 430/552 |
| 4,744,181 | 5/1988 | Moore et al. | 51/436 |
| 4,775,616 | 10/1988 | Kilminster et al. | 430/552 |
| 4,777,120 | 10/1988 | Lau | 430/359 |
| 4,782,012 | 11/1988 | DeSelms et al. | 430/544 |
| 4,832,275 | 5/1989 | Robertson | 242/71.1 |
| 4,846,418 | 7/1989 | Fairman | 242/71.1 |
| 4,848,693 | 7/1989 | Robertson | 242/71.1 |
| 4,947,196 | 8/1990 | Wash et al. | 354/76 |
| 5,154,995 | 10/1992 | Kawai | 430/22 |
| 5,218,392 | 6/1993 | Sakamoto et al. | 354/106 |

PHOTOGRAPHIC INFORMATION RECORDING METHOD

FIELD OF THE INVENTION

This invention relates to a method of recording photographic information on a film, and more particularly to a photographic information recording method that cause less read errors.

BACKGROUND OF THE INVENTION

U.S. Pat. No. 4,947,196 and International Patent Publication No. 90/04254 disclose a photographic camera having a roll film and a magnetic head, the former having a magnetic layer containing magnetic particles that enable reading on the back of the photographic film. According to high improvement technique, information used to distinguish the types or manufacturers of light-sensitive materials, information relating to conditions under which photographs are taken, information. relating to customers, information relating to printing conditions, information relating to reorder printing and other information can be magnetically inputted in and outputted from the magnetic layer on the film, so that it becomes possible to improve printing quality, make printing operation efficient and make photofinisher's office work efficient.

However, when information is inputted in a photographic film from a camera, the above magnetic recording system requires providing a magnetic head in the camera, and also requires a mechanism for holding the magnetic head, bringing about the disadvantage that the camera not only must be made large-sized but also can be expensive.

In the meantime, as measures against such magnetic recording, a method of optically recording information is known, which is a method comprising recording information on a photographic film by the use of a light source, followed by photographic processing to set the information stationary. Japanese Patent Publications Open to Public Inspection [hereinafter referred to as Japanese Patent O.P.I. Publication(s)] No. 96635/1991 and No. 116137/1991 disclose a method of recording-image-trimming information on a film by using an LCD as a light source; Japanese Patent O.P.I. Publication No. 161727, a method of optically recording information regarding the position of photographed images on film in the form of bar codes; Japanese Patent O.P.I. Publication No. 135535/1991, a method of optically recording information concerning photographing conditions on a film in the form of dot codes; and Japanese Patent O.P.I. Publication No. 125543/1992, a method in which information of districts where photographs are taken is optically recorded on a film in the form of numbers or letters.

These are so designed that the information is optically recorded mainly on non-image areas of a film and can be effectively recorded in smaller areas.

As light sources are made small-sized in recent years, compact and inexpensive cameras can be made available even if the light sources are provided in cameras as optical recording units.

Since, however, the proposals hitherto made are still in the stage of application of a fundamental principle of optical recording, no sufficient discussion has been made in order to provide an optimum combination of a writing light source, properties of a light-sensitive material, a reading light source and so forth that are important in the optical recording. Accordingly, nothing has been accomplished more than the recording of dates of photographing in pictures, and no wide practical use as information processing has been made. Moreover, since the optically recorded information, which is recorded as colored dye images in photographic films (light-sensitive silver halide color photographic materials), may undergo variations in color-forming density because of influence by non-uniform degrees of activity and exhaustion of processing solutions in photofinishing laboratories, and hence there is a disadvantage that read errors may occur. Thus, it is sought to immediately solve the above problems.

SUMMARY OF THE INVENTION

Accordingly, an object of the present invention is to provide a photographic information recording method that can record photographic information by using a small-sized inexpensive camera and may cause less read errors of photographic information.

The object of the present invention can be achieved by a method for photographically recording an information pattern. The method comprises the steps of (1) writing an information pattern at an area outside the picture taking area of a silver halide color photographic film, with red-light having an intensity peak at a wavelength of 620 nm or above emitted from a photo-emission diode, (2) processing the color photographic film, and (3) optically reading an image of the pattern formed on the color photographic film, with red-light having an intensity peak at a wavelength of 620 nm or above. In the method, a red-sensitive silver halide emulsion layer of the color photographic film contains a coupler represented by the following Formula CU.

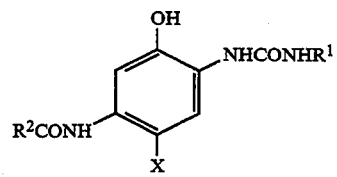

wherein X represents a hydrogen atom or a substituent capable of being split off upon coupling with an aromatic primary amine color developing agent; $R^1$ represents an aryl group or a heterocyclic ring; $R^2$ represents an aliphatic group or an aryl group; and a group represented by $R^1$ or $R^2$ may have a substituent.

In a preferred embodiment, the information is optically recorded from the light-sensitive layer side of the photographic film.

The present invention also provides a photographic information reading method comprising subjecting the photographic film on which the information has been recorded by the above photographic information recording method and which has been photographically processed, to irradiation with a ray having the emission maximum wavelength of 620 nm or above.

In the present invention, the optical recording using a light-emitting diode should preferably be carried out from the photographic component layer side of a light-sensitive silver halide color photographic material. This is because optical recording carried out from the opposite side of photographic component layers may result in a decrease or non-uniformity of recording precision because of optical influence by a backing layer, an anti-halation layer, an antistatic layer, a subbing layer, a magnetic recording layer and also a support itself of the light-sensitive material.

Accordingly, the light-emitting diode should preferably be provided in a camera at its position on the side from which imagewise exposure is made, i.e., the main body side of the camera. It is not preferable to provide the light-emitting diode on the camera back side.

In the present invention, the photographic information reading method comprising subjecting the photographic film on which the information has been recorded by the above photographic information recording method and which has been photographically processed, to irradiation with red light having the maximum intensity wavelength of 620 nm or above, and preferably 650 nm to 700 nm. A light-emitting diode having the same emission maximum wavelength as used when the information is recorded is preferably used as a light source, which can bring about a great decrease in occurrence of read errors.

DETAILED DESCRIPTION OF THE INVENTION

Figure 1:
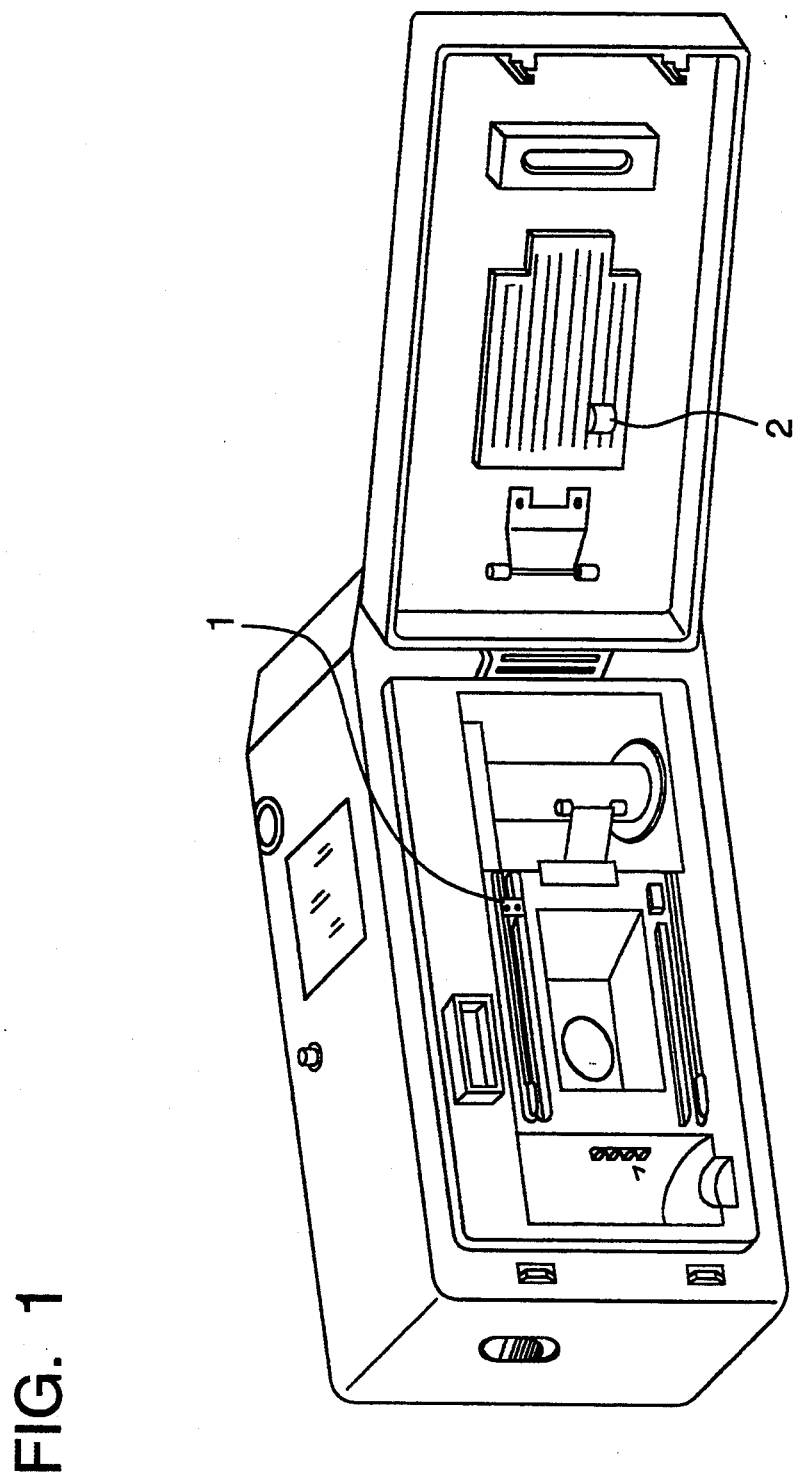
FIG. 1 is a schematic illustration of a camera with a built-in light-emitting diode.

In the present invention, the red light-emitting diode has an emission maximum wavelength of 620 nm or above, and preferably from 650 nm to 700 nm. Any red light-emitting diodes can be used so long as they have an emission maximum wavelength within this range.

Typical ones include GaAsP (650 nm), AlGaAs (660 nm), GaPZnO (700 nm). Other red light-emitting diodes are disclosed, for example, in Furuike et al., "Higher-luminance and Multi-colored Visible-light Emitting Diodes", Applied Physics, 53, 132 (1984).

In the present invention, the red light-emitting diode is provided as an optical recording unit in a camera. Here, an optical system such as lenses and optical fibers may preferably be provided together. When information is recorded on a photographic film (a light-sensitive silver halide color photographic material) by means of the red light-emitting diode, the recording should preferably be carried out from the light-sensitive layer side of the photographic film.

In the present invention, the ray used to read information preferably has the maximum intensity wavelength of 620 nm or above, and more preferably from 650 nm to 700 nm. It is most preferably a ray having the same emission maximum wavelength as used when the information is recorded. As a light source of the ray, a light-emitting diode is preferably used. The present invention can be effective also when the emission maximum wavelength is within the range of ±5 nm.

In the present invention, the object of the present invention can be achieved when a coupler represented by the following Formula CU is incorporated in a red-sensitive layer of the photographic film.

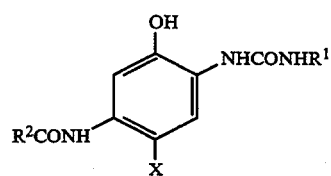

Formula CU

In the formula, X represents a hydrogen atom or a group capable of being split off upon coupling with an aromatic primary amine color developing agent. $R^1$ represents an aryl group or a heterocyclic ring. $R^2$ represents an aliphatic group or an aryl group. A group represented by $R^1$ or $R^2$ may have a substituent, or may be a group that forms a dimer or higher polymer according to $R^1$ or $R^2$. At least one of $R^1$ and $R^2$ is a straight or branched chain alkyl group having 10 or more carbon atoms or a group linked with a polymer chain.

The aryl group represented by $R^1$ or $R^2$ may include, for example, a phenyl group end a naphthyl group.

The substituent of the group represented by $R^1$ or $R^2$ may include, for example, a halogen atom, a nitro group, a cyano group, an alkyl group, an aryl group, an amino group, a hydroxyl group, an acryl group, an alkoxycarbonyl group, an aryloxycarbonyl group, an alkylsulfonyl group, an arylsulfonyl group, an alkoxysulfonyl group, an aryloxysulfonyl group, a carbamoyl group, a sulfamoyl group, an acyloxy group, a carbonamido group and a sulfonamido group. The substituent may preferably be 1 to 5 in number. When it is two or more in number, the substituents may be the same or different.

The substituent on $R^1$ is preferably a halogen atom, an alkylsulfonyl group or a cyano group.

$R^2$ may preferably be a group represented by the following Formula CU-II.

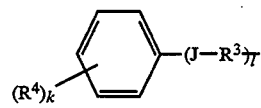

Formula CU-II

In the formula, J represents an oxygen atom or a sulfur atom. k represents an integer of 0 to 4, and Q is 0 or 1. When k is 2 or more, the $R^4$ that numbers two or more may be the same or different. $R^3$ represents an alkylene group, and $R^4$ represents a substituent.

The substituent represented by $R^4$ may include, for example, an alkyl group, an aryl group, an alkoxyl group, an aryloxy group, a hydroxyl group, an acyloxy group, an alkylcarbonyloxy group, an arylcarbonyloxy group, a carboxyl group, an alkoxycarboxyl group, an aryloxycarbonyl group, an alkylthio group, an acyl group, an acylamino group, a sulfonamido group, a carbamoyl group and a sulfamoyl group.

The substituent capable of being split off, represented by X can be exemplified by a halogen atom, and an aryloxy group, alkoxyl group, acyloxy group, arylthio group, alkylthio group, sulfonamido group and acid imido group to the coupling position of which an oxygen atom or a nitrogen atom is directly bonded. More specific examples thereof are those disclosed in U.S. Pat. Nos. 3,476,563 and 3,749,735, Japanese Patent O.P.I. Publication No. 37425/1972, Japanese Patent Examined Publication No. 36894/1973, Japanese Patent O.P.I. Publications No. 10135/1975, No. 117422/1975, No. 130441/1975, No. 108841/1976, No. 120334/1975, No. 18315/1977 and No. 105226/1978.
The phenol type cyan coupler of the present invention may be used in combination with other cyan coupler. In this case, it may preferably be used in a percentage of 10 mol % or more.
Examples of the phenol type cyan coupler of the present invention are shown below.
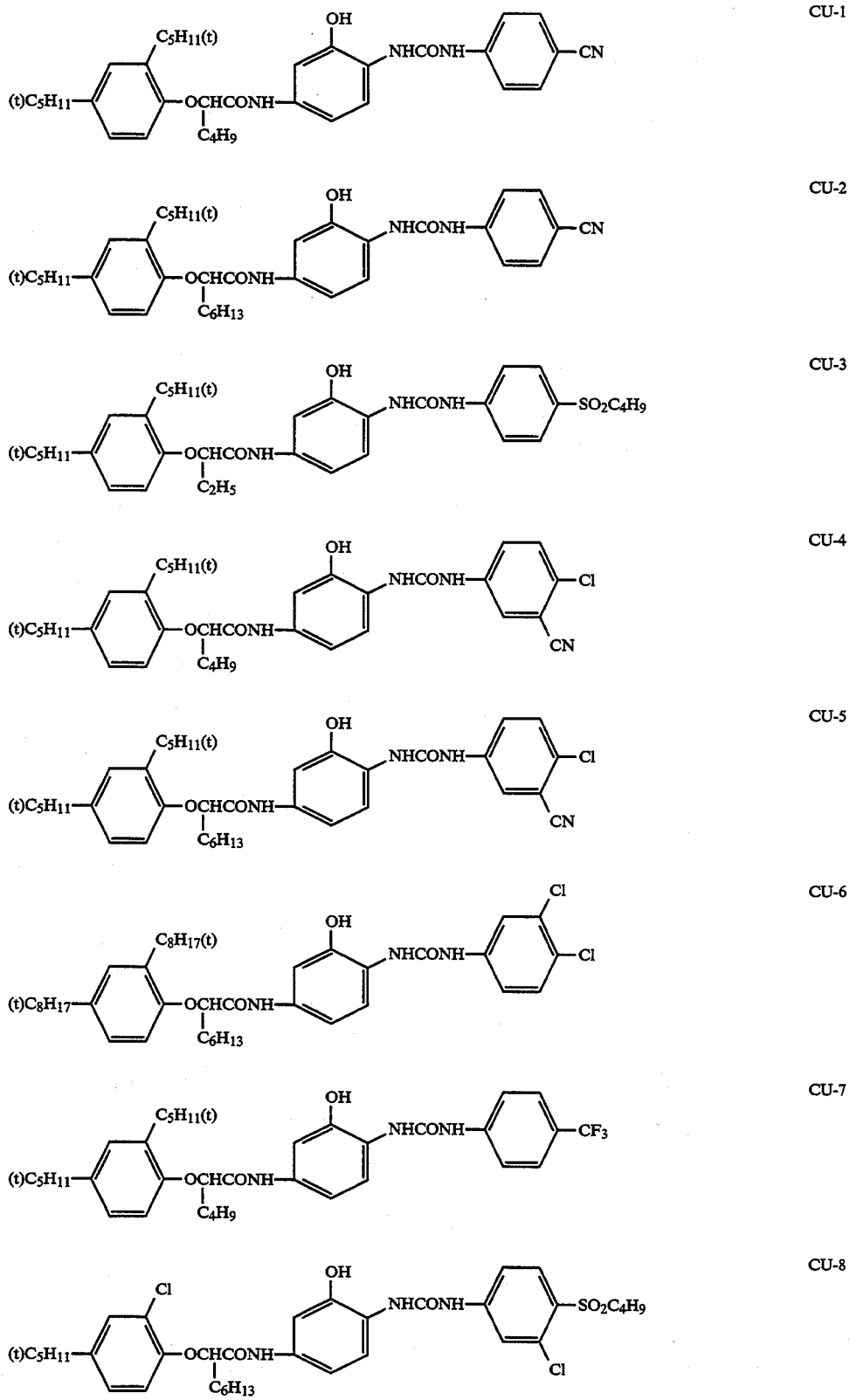

-continued
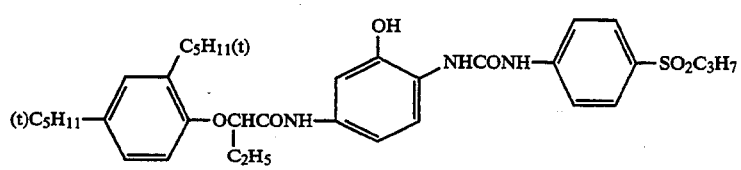 CU-9
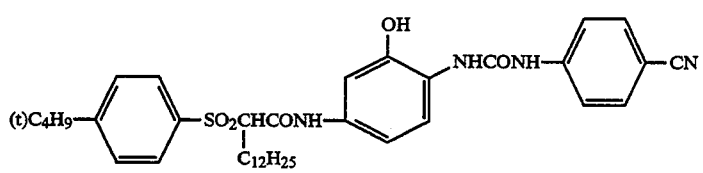 CU-10
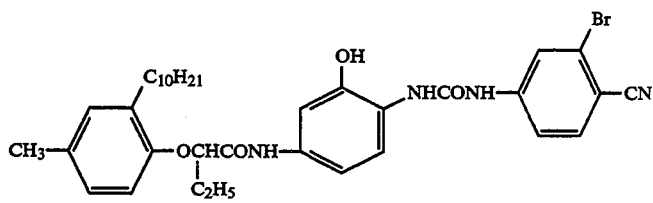 CU-11
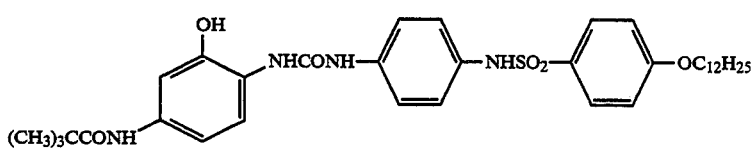 CU-12
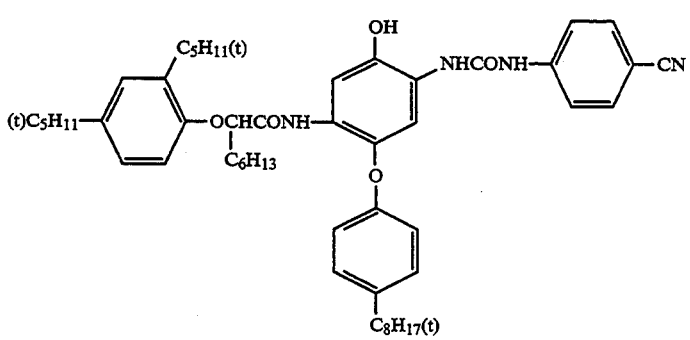 CU-13
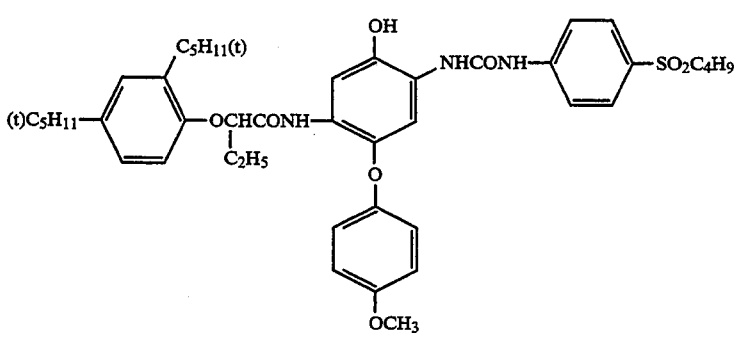 CU-14
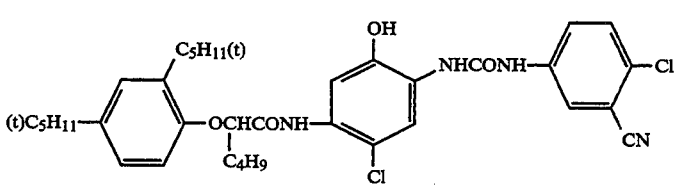 CU-15

-continued
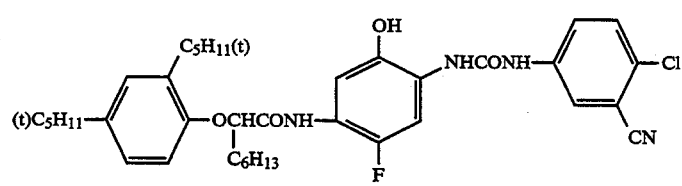
CU-16
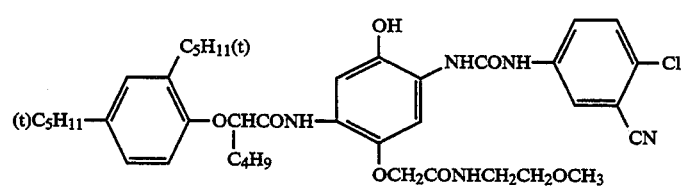
CU-17
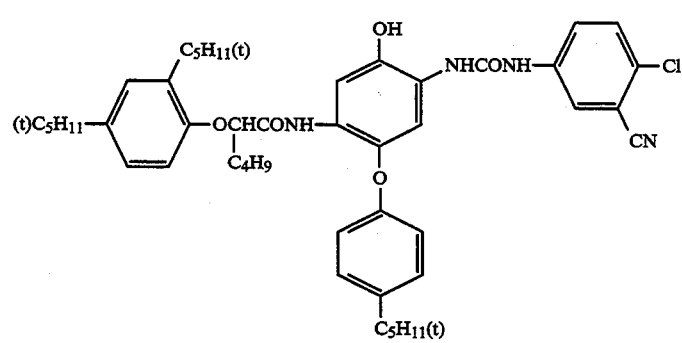
CU-18
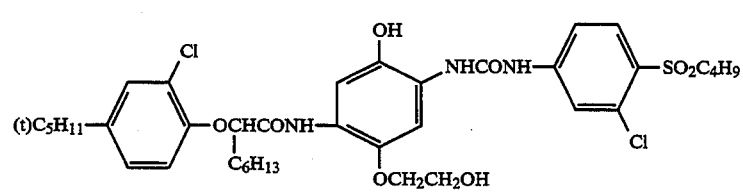
CU-19
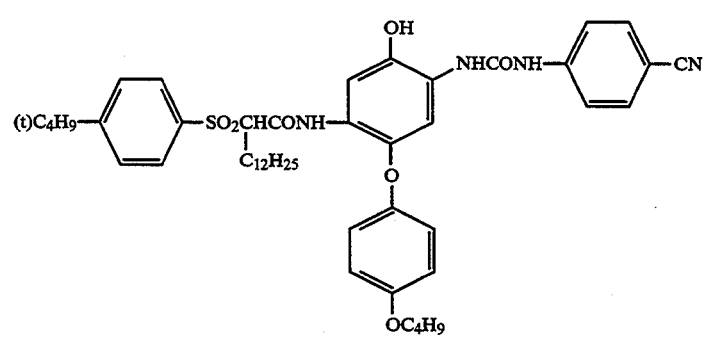
CU-20
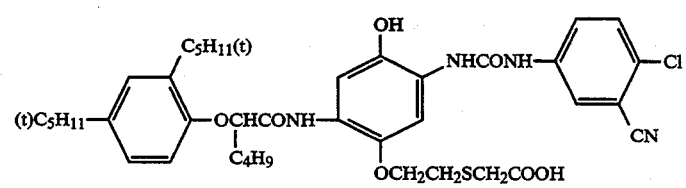
CU-21

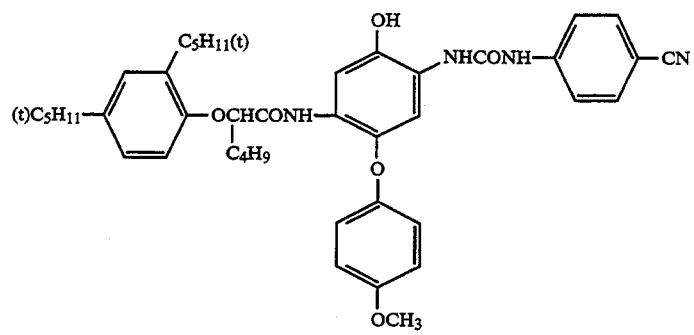
CU-22
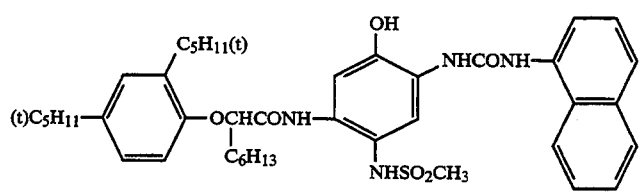
CU-23
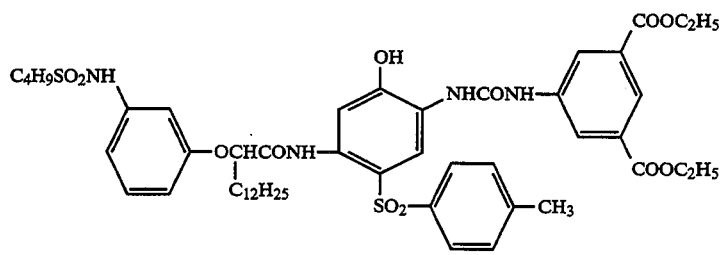
CU-24
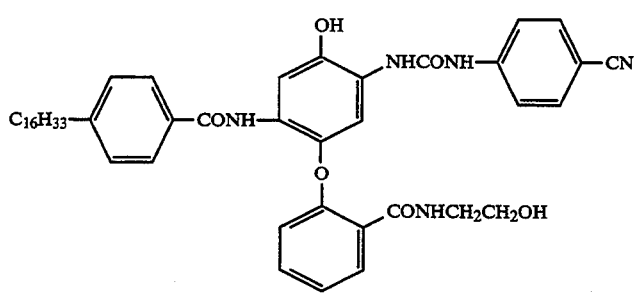
CU-25
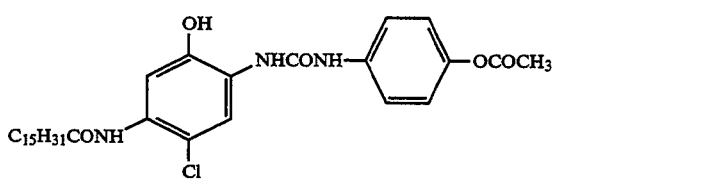
CU-26
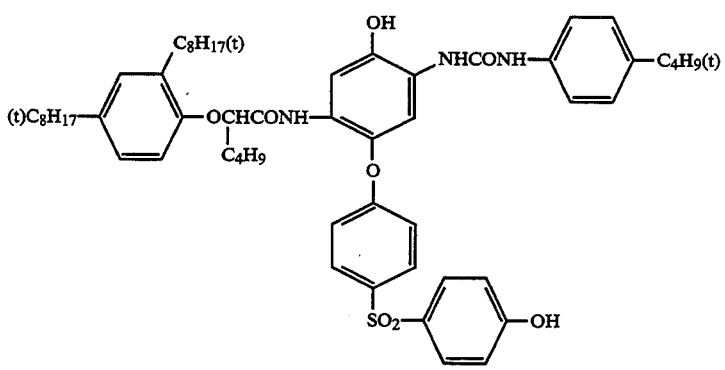
CU-27

CU-28
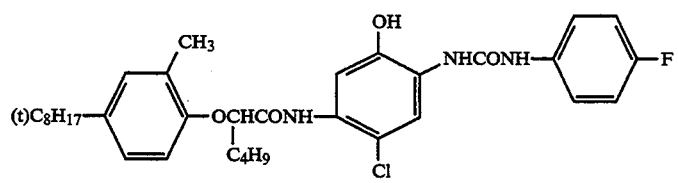
CU-29
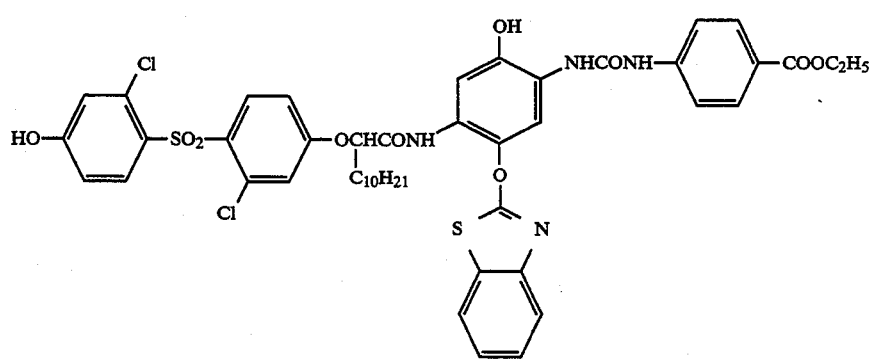
CU-30
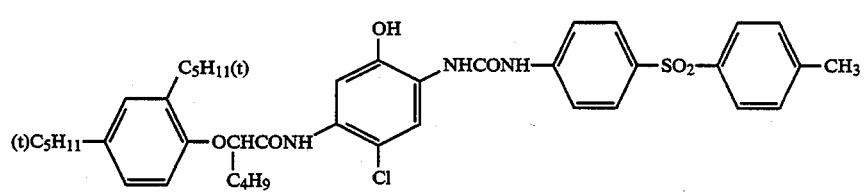
CU-31
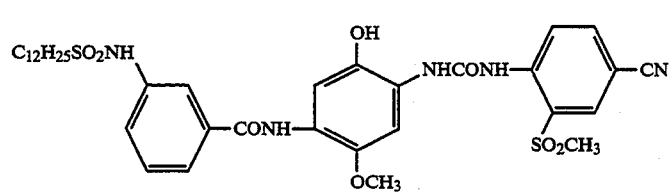
CU-32
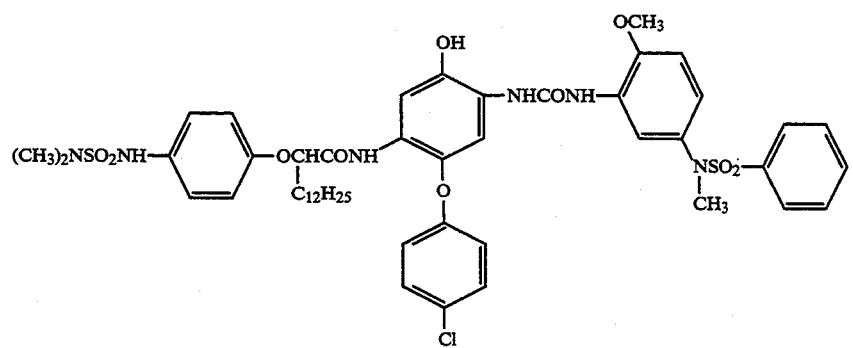
CU-33
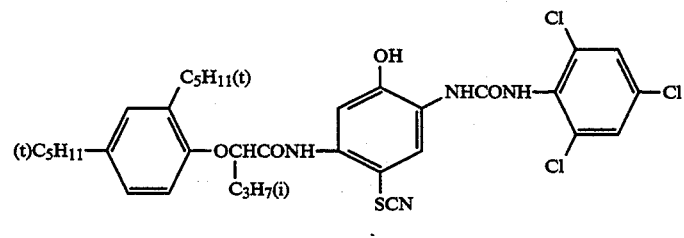

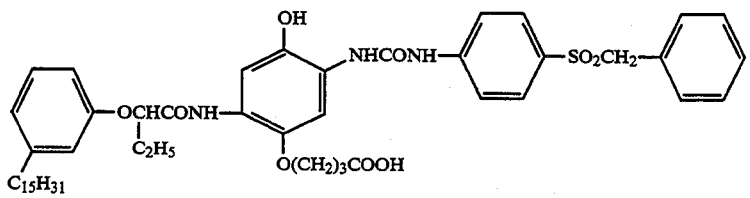
CU-34
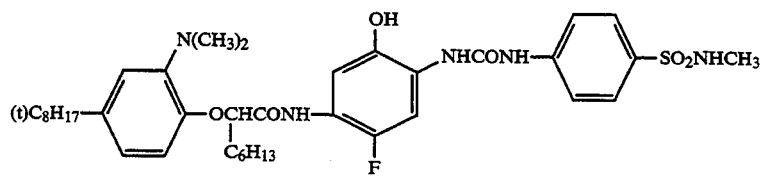
CU-35
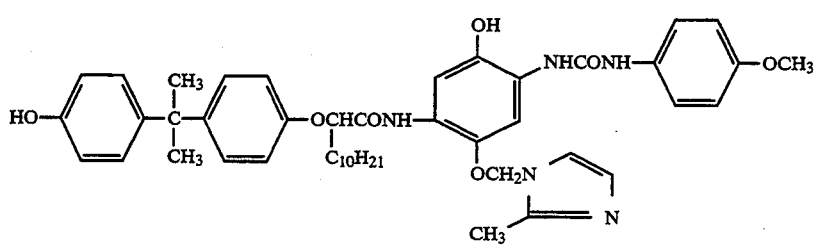
CU-36
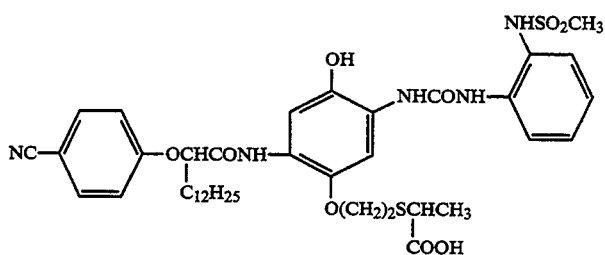
CU-37
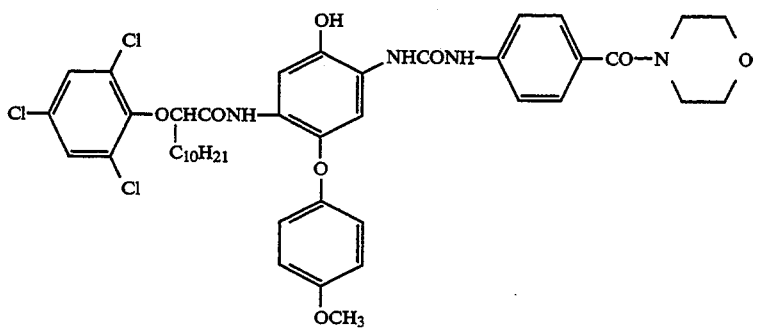
CU-38
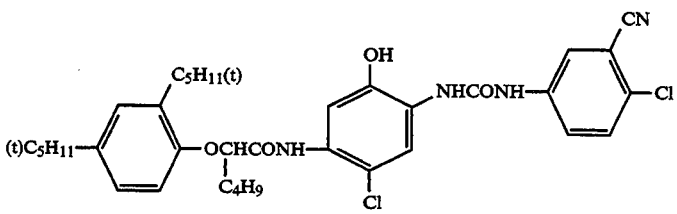
CU-39
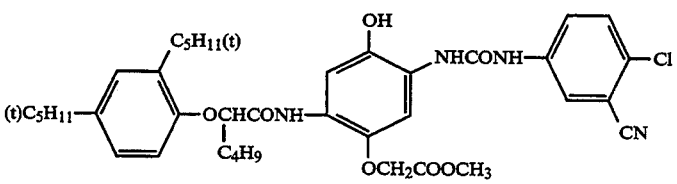
CU-40

CU-41
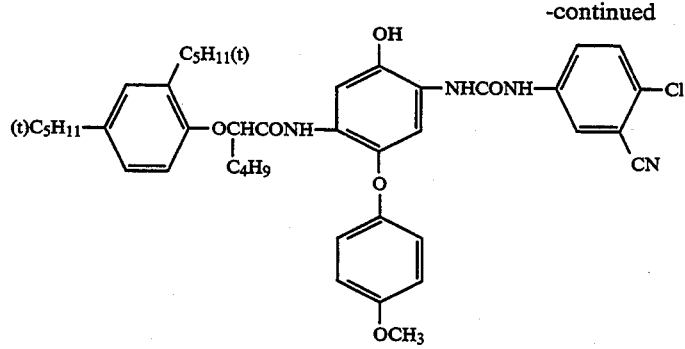
CU-42
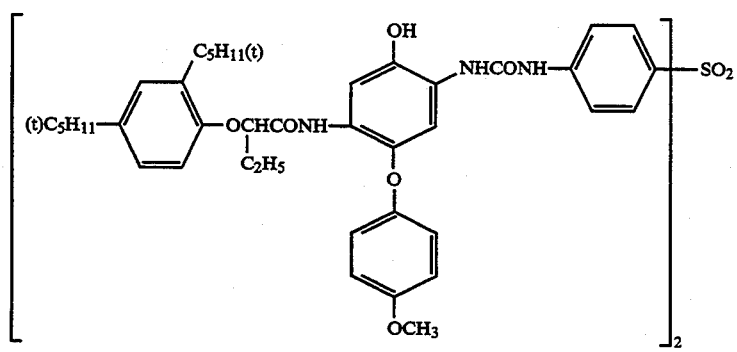
CU-43
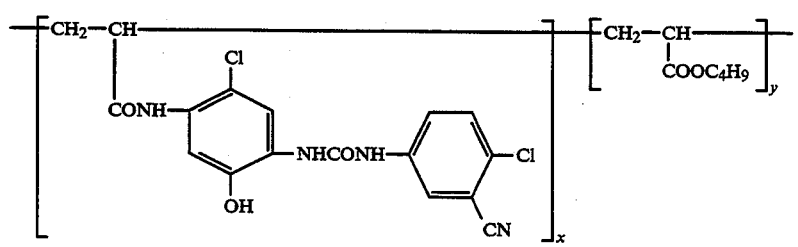
x:y = 50:50 (weight ratio)
CU-44
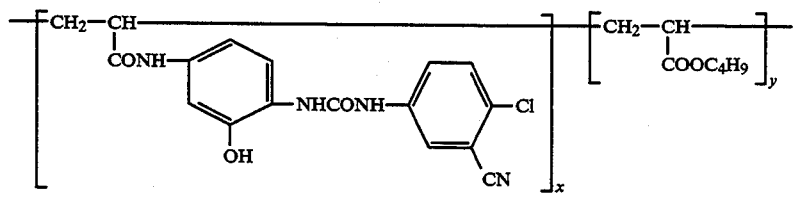
x:y = 50:50 (weight ratio)
CU-45
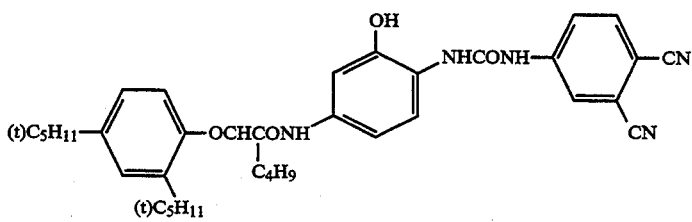
CU-46
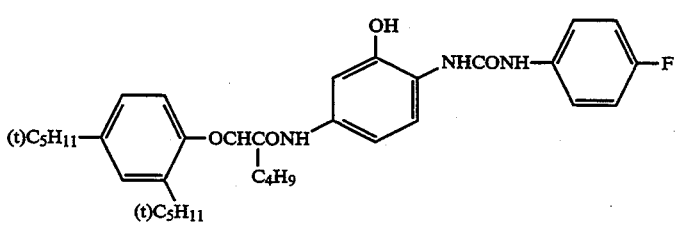

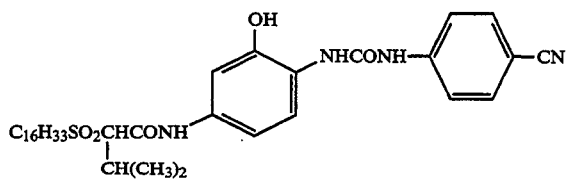
CU-47
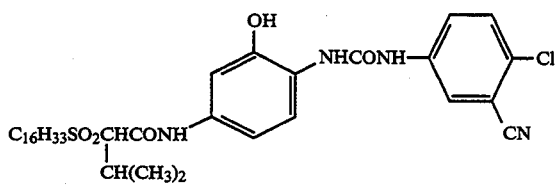
CU-48
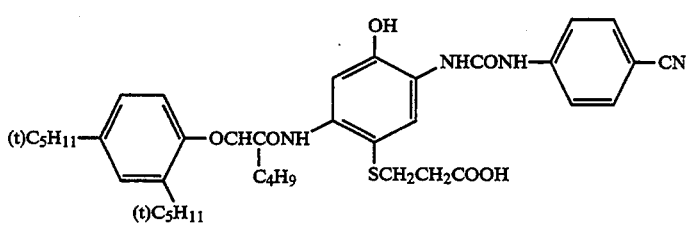
CU-49
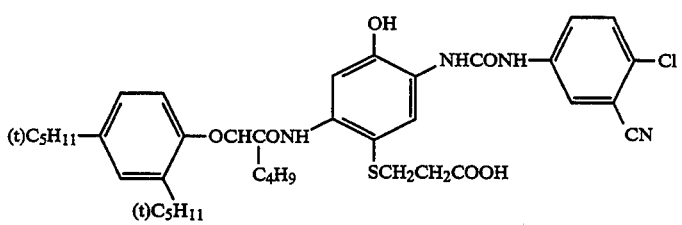
CU-50
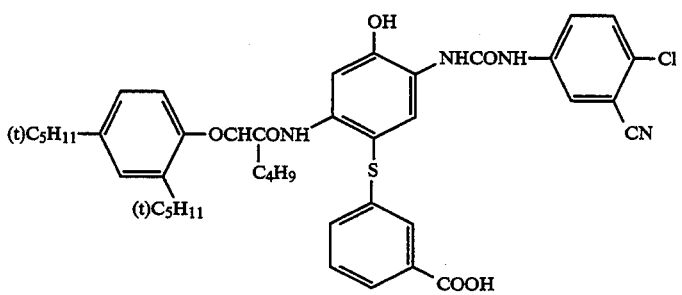
CU-51
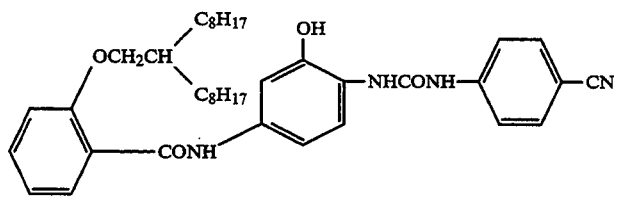
CU-52
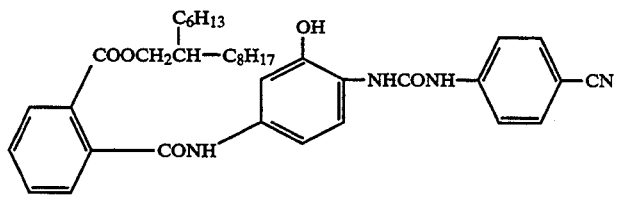
CU-53
Other examples of the phenol type cyan coupler having a ureido group, other than the examples shown above, are those disclosed, for example, in Japanese Patent O.P.I. Publications No. 65134/1981, No. 204543/1982, No. 204544/1982, No. 204545/1982, No. 33249/1983, No. 33253/1983, No. 98731/1983, No. 118643/1983, No. 179838/1983, No. 187928/1983, No.

65844/1984, No. 71051/1984, No. 86048/1984, No. 105644/1984, No. 111643/1984, No. 111644/1984, No. 131939/1984, No. 165058/1984, No. 177558/1984, No. 180559/1984, No. 198455/1984, No. 35731/1985, No. 37557/1985, No. 49335/1985, No. 49336/1985, No. 50533/1985, No. 91355/1985, No. 107649/1985, No. 107650/1985, No. 2757/1986, No. 18948/1986, No. 20039/1986, No. 42658/1986, No. 56348/1986, No. 65241/1986, No. 72244/1986, No. 72245/1986, No. 75350/1986, No. 75351/1986, No. 173467/1987, No. 33745/1988, No. 159848/198.8, No. 161450/1988, No. 161451/1988, No. 172951/1989, No. 172952/1989, No. 172953/1989, No. 172954/1989, No. 219749/1989, No. 253738/1989, No. 253739/1989 No. 253740/1989, No. 253741/1989, No. 253742/1989, No. 253743/1989 and No. 254956/1989, and Research Disclosure (RD) No. 30164.

The phenol type cyan coupler represented by Formula CU may usually be added in an amount ranging preferably from $1.0 \times 10^{-3}$ mol to 1.0 mol, and more preferably from $5.0 \times 10^{-3}$ mol to $8.0 \times 10^{-1}$ mol, per mol of silver halide contained in the layer in which the coupler is added.

The light-sensitive silver halide color photographic material used in the present invention will be described below.

Light-Sensitive Layers

The light-sensitive silver halide color photographic material according to the present invention can be used as a full-color photographic material. The full-color photographic material usually has a red-sensitive layer containing a cyan coupler, a green-sensitive layer containing a magenta coupler and a blue-sensitive layer containing a yellow coupler. These light-sensitive layer may each be a single layer or be comprised of a plurality of layers. The coupler of the present invention is used in the red-sensitive layer.

There are no particular limitations on the order in which these light-sensitive layers are overlaid. They may be overlaid in any desired order depending on the purpose. For example, they may be overlaid in the order of a red-sensitive layer, a green-sensitive layer and a blue-sensitive layer from the support side, or, in reverse, may be overlaid in the order of a blue-sensitive layer, a green-sensitive layer and a red-sensitive layer from the support side.

A light-sensitive layer having a different color sensitivity may be so provided as to be sandwiched between two light-sensitive layers having the same color sensitivity. For the purpose of improving color reproduction, a light-sensitive layer or layers with a fourth or more color sensitivity may also be provided in addition to the three layers, the red-sensitive layer, the green-sensitive layer and the blue-sensitive layer. The layer configuration that employs the light-sensitive layer or layers with a fourth or more color sensitivity is disclosed in Japanese Patent O.P.I. Publications No. 41/1986, No. 201245/1985, No. 198236/1986 and No. 160448/1987. Reference can be made to these publications.

In this case, the light-sensitive layer or layers with a fourth or more color sensitivity may be provided layer by layer at any position. The light-sensitive layer or layers with a fourth or more color sensitivity may each be a single layer or be comprised of a plurality of layers.

Various types of non-sensitive layers may be provided between the respective light-sensitive layers and on the uppermost side and the lowermost side.

These non-sensitive layers may contain couplers, DIR compounds, etc. as disclosed in Japanese Patent O.P.I. Publications No. 43548/1985, No. 113438/1984, No. 113440/1984, No. 20037/1986 and No. 20038/1986, and may also contain color mixing preventive agents as usually used. These non-sensitive layers may also be auxiliary layers such as filter layers or intermediate layers disclosed in RD308119, page 1002, paragraph VII-K.

The layer configuration that can be employed in the light-sensitive silver halide color photographic material according to the present invention may include the regular layer configuration, the reverse layer configuration and the unit configuration as disclosed in RD308119, page 1002, paragraph VII-K.

In the case when there are two light-sensitive layers having the same color sensitivity, these light-sensitive layers may be like layers or may be of double-layer configuration comprised of a high-speed emulsion layer and a low-speed emulsion layer as disclosed in West German Patent No. 923,045. In this case, usually the layers may preferably be provided in the manner that their light-sensitivities or speeds become lower toward the support in order, and a non-sensitive layer may also be provided between the respective emulsion layers. As disclosed in Japanese Patent O.P.I. Publications No. 112551/1982, No. 200350/1987, No. 205541/1985 and No. 206543/1987, the low-speed emulsion layer may also be provided on the side far from the support, and the high-speed emulsion layer, on the side near to the support.

To show examples, layers may be provided in the order of a low-speed blue-sensitive layer (BL)/a high-speed blue-sensitive layer (BH)/a high-speed green-sensitive layer (GH)/a low-speed green-sensitive layer (GL)/a high-speed red-sensitive layer (RH)/a low-speed red-sensitive layer (RL), in the order of BH/BL/GL/GH/RH/RL or in the order of BH/BL/GH/GL/RL/RH, from the side farthest from the support.

As disclosed in Japanese Patent Examined Publication No. 34932/1980, layers may also be arranged in the order of a blue-sensitive layer/GH/RH/GL/RL from the side farthest from the support. As disclosed in Japanese Patent O.P.I. Publications No. 25738/1981 and No. 63936/1987, they may still also be arranged in the order of a blue-sensitive layer/GL/RL/GH/RH from the side farthest from the support.

As disclosed in Japanese Patent Examined Publication No. 15495/1974, it is also possible to use three light-sensitive layers having different speeds and the same color sensitivity. These three layers are so provided that a high-speed silver halide emulsion layer is on the upper layer, a medium-speed silver halide emulsion layer is on the middle layer and a low-speed silver halide emulsion layer is on the lower layer. As also disclosed in Japanese Patent O.P.I. Publication No. 202464/1984, layers may be provided in the order of a medium-speed silver halide emulsion layer, a high-speed silver halide emulsion layer and a low-speed silver halide emulsion layer from the side far from the support.

In the case when layers are comprised of such three layers having different speeds, these three layers may be overlaid in any desired order, for example, in the order of a high-speed silver halide emulsion layer, a low-speed silver halide emulsion layer and a medium-speed silver halide emulsion layer, or in the order of a low-speed silver halide emulsion layer, a medium-speed silver halide emulsion layer and a high-speed silver halide emulsion layer. Four light-sensitive layers having the same color sensitivity may also be used. In this case also, they may be provided in any desired order as in the above.

As described above, any layer configuration or arrangement can be selected in variety according to the purpose for which the respective light-sensitive materials are used.

Silver Halide Emulsions

The silver halide emulsions used in the present invention may be either polydisperse or monodisperse. Monodisperse emulsions are preferred as having uniform grain size.

In the present invention, a preferred monodisperse emulsion is an emulsion in which the weight of silver halide included in the grain size range of ±20% around average grain size d is not less than 70%, more preferably not less than 80%, and particularly preferably not less than 90%, of the weight of the whole silver halide.

Herein the weight average grain size d is defined to be grain size $d_i$ determined when $n_i \times d_i^3$ which is the product of frequency $n_i$ of grains having grain size $d_i$ and $d_i^3$ comes to be maximum. (Effective numeral is 3 figures, and minimum numeral is rounded off.) The grain size $d_i$ herein referred to is a diameter obtained when a projected image of a grain is calculated as a circular image having the same area. The grain size $d_i$ can be obtained, for example, scattering the grains over a flat sample stand in the manner that they do not overlap one another, and photographing the grains projected at magnifications of 10,000 to 50,000 using an electron microscope and actually measuring the diameters or areas of the grains on a print. (The number of grains measured may be 1,000 or more selected at random.)

When the grain size distribution of a silver halide emulsion has a single peak, the degree of monodispersity can also be represented by the breadth of distribution calculated by the following expression.

{(grain size standard deviation)/(average grain size)} × 100 = breadth of distribution (%).

Here the grain size is measured according to the method previously described, and the average grain size is on the arithmetric mean calculated by the following expression.

Average grain size $= \Sigma d_i n_i / \Sigma n_i$

The smaller the breadth of distribution calculated by this expression is, the larger the monodispersity is.

When the monodispersity is represented by the above breadth of distribution, the silver halide emulsions of the present invention may preferably have a breadth of distribution of 20% or less, and more preferably 15% or less.

The silver halide emulsions used in the present invention can be prepared by the methods disclosed in Emulsion Preparation and Types, Research Disclosure (RD) No. 17643, December 1978, pp. 22–23 and RD18716, p. 648; P. Glafkides, "Chemie et Physiquephotographique", published by Paul Montel Co. (1965); G. F. Duffin, "Photographic Emulsion Chemistry", published by Focal Press Co. (1966); and V. L. Zelikman et al, "Making and Coating Photographic Emulsion", published by Focal Press (1964); etc. The emulsions may also preferably include the monodisperse emulsions disclosed in U.S. Pat. Nos. 3,574,628 and 3,665,394 and British Patent No. 1,413,748.

In the emulsions used in the light-sensitive silver halide photographic material of the present invention, various photographic additives can be used in the step anterior or posterior to physical ripening or chemical ripening.

As compounds used in such a step, the various compounds as disclosed in, for example, the above Research Disclosures No. 15643, No. 18516 and No. 308119 can be used. Kinds of the compounds disclosed in these three Research Disclosures and the paragraphs or columns in which they are described are shown in the following.

| Items | Page of RD308119, | | RD17643, | RD18716 |
|---|---|---|---|---|
| Chemical sensitizer | 996 | Par. III-A | 23 | 648 |
| Spectral sensitizer | 996 | Par. IV-A-A,B,C,D,E,H,I,J | 23–24 | 648–649 |
| Supersensitizer | 996 | Par. IV-A-E,J | 23–24 | 648–649 |
| Antifoggant | 998 | Par. VI | 24–25 | 649 |
| Stabilizer | 998 | Par. VI | 24–25 | 649 |
| Color contamination preventive agent | 1002 | Par. VII-I | 25 | 650 |
| Dye image stabilizer | 1001 | Par. VII-J | 25 | |
| Brightening agent | 998 | V | 24 | |
| Ultraviolet absorbent | 1003 | Par. VIIIC & XIIIC | 25–26 | |
| Light absorbing agent | 1003 | Par. VIII | 25–26 | |
| Light scattering agent | 1003 | Par. VIII | | |
| Filter dye | 1003 | Par. VIII | 25–26 | |
| Binder | 1003 | Par. IX | 26 | 651 |
| Antistatic agent | 1006 | Par. XIII | 27 | 650 |
| Hardening agent | 1004 | Par. X | 26 | 651 |
| Plasticizer | 1006 | Par. XII | 27 | 650 |
| Lubricant | 1006 | Par. XII | 27 | 650 |
| Surfactant, coating aid | 1005 | Par. XI | 26–27 | 650 |
| Matting agent | 1007 | Par. VI | | |
| Developing agent (contained in light-sensitive materials) | 1011 | Par. XX-B | | |

In the light-sensitive silver halide color photographic material according to the present invention, a compound capable of being set stationary upon reaction with formaldehyde, disclosed in U.S. Pat. Nos. 4,411,987 and 4,435,503, may preferably be added to the light-sensitive material so that its photographic performance can be prevented from deterioration due to formaldehyde gas.

There are no particular limitations on the coating weight of silver in the light-sensitive silver halide color photographic material according to the present invention, and the silver may preferably be in an amount of not more than 10 g/m² to not less than 3 g/m², and particularly preferably not more than 7 g/m² to not less than 3 g/m², in terms of silver. There are also no particular limitations on the weight of silver based on gelatin binder, and the silver may preferably be used within the range of from 0.01 to 5.0 as silver/gelatin weight ratio, depending on whether it is used in high-speed emulsion layers or low-speed emulsion layers and on other purposes.

The silver halide emulsion used in the light-sensitive silver halide color photographic material according to the present invention may preferably contain silver iodobromide containing 4 to 20 mol % of silver iodide as an average content, and particularly preferably contain silver iodobromide containing 5 to 15 mol % of silver iodide as an average content. The silver halide emulsion in the present invention may contain silver chloride so long as the object of the present invention is not damaged.

In the light-sensitive silver halide color photographic material, various color couplers may be used.

As yellow couplers, they may preferably be those disclosed, for example, in U.S. Pat. Nos. 3,933,051, 4,022,620, 4,326,024, 4,401,552 and 4,248,961, Japanese Patent Examined Publication No. 10739/1983, British Patents No. 1,425,020, U.S. Pat. Nos. 4,314,023 and 4,511,649, and European Patent No. 249,473A.

As magenta couplers, they may preferably be 5-pyrazolone type and pyrazoloazole type compounds, and particularly preferably be those disclosed in U.S. Pat. Nos. 4,310,619 and 4,351,897, European Patent No. 73,636, U.S. Pat. Nos. 3,051,432 and 3,725,067, RD24220 (June, 1984), Japanese Patent O.P.I. Publication No. 33552/1985, RD24230 (June, 1984), Japanese Patent O.P.I. Publications No. 43659/1985, No. 52238/1986, No. 35730/1985, No. 118034/1980 and No. 185951/1985, U.S. Pat. Nos. 4,500,630, 4,540,654 and 4,556,630, International Publication W088/04795, etc.

As cyan couplers, they may include known phenol and naphthol type couplers in combination with the coupler of the present invention, preferably those disclosed, for example, in U.S. Pat. Nos. 4,228,233, 4,296,200, 2,369,929, 2,810,171, 2,772,162, 2,895,926, 3,772,002, 3,558,308, 4,334,011 and 4,327,173, West German Patent No. 3,329,729, European Patents No. 121,365A and No. 249,453A, U.S. Pat. Nos. 3,446,622, 4,333,999, 4,775,616, 4,451,559, 4,427,757, 4,690,889, 4,254,212 and 4,296,199, and Japanese Patent O.P.I. Publication No. 42558/1986.

Colored couplers for correcting unnecessary absorption of color forming dyes may preferably include those disclosed in U.S. Pat. No. 4,163,670, Japanese Patent Examined Publication No. 39413/1982, U.S. Pat. Nos. 4,004,929 and 4,138,258 and British Patent No. 1,145,368. It is also preferable to use the couplers capable of correcting unnecessary absorption of color forming dyes by the aid of a fluorescent dye released at the time of coupling, as disclosed in U.S. Pat. No. 4,744,181, and the couplers having as an eliminable group a dye precursor group capable of forming a dye upon reaction with a developing agent, as disclosed in U.S. Pat. No. 4,777,120.

Couplers whose color forming dyes have an appropriate diffusibility may preferably include those disclosed in U.S. Pat. No. 4,356,237, British Patent No. 2,125,570, European Patent No. 96,570 and West German Patent Publication No. 3,234,533.

Typical examples of dye forming couplers formed into polymers are disclosed in U.S. Pat. Nos. 3,451,820, 4,080,211, 4,367,282, 4,409,320 and 4,576,910, British Patent No. 2,102,173.

Couplers capable of releasing a photographically useful residual group upon coupling may also preferably be used in the present invention. DIR couplers, capable of releasing a development inhibitor, may preferably be those disclosed in Japanese Patent O.P.I. Publications No. 151944/1982, No. 154234/1982, No. 184248/1985 and No. 37346/1988, and U.S. Pat. Nos. 4,248,962 and 4,782,012.

Couplers capable of imagewise releasing a nucleating agent or development accelerator may preferably include those disclosed in British Patents No. 2,097,140 and No. 2,131,188, and Japanese Patent O.P.I. Publications No. 157638/1984 and No. 170840/1984.

Besides these, couplers that can be used in the light-sensitive silver halide color photographic material according to the present invention may include the competing couplers as disclosed in U.S. Pat. No. 4,130,427, the polyequivalent couplers as disclosed in U.S. Pat. Nos. 4,283,472, 4,338,393 and 4,310,618, DIR redox compound releasing couplers, DIR coupler releasing couplers, DIR coupler releasing redox compounds or DIR redox releasing redox compounds as disclosed in Japanese Patent O.P.I. Publications No. 185950/1985 and No. 24252/1987, the couplers capable of releasing a dye that is recurrent after being split off as disclosed in European Patent No. 173,302A, the bleach accelerator releasing couplers as disclosed in RD11449 and 24241 and Japanese Patent O.P.I. Publication No. 201247/1986, the ligand releasing couplers as disclosed in U.S. Pat. No. 4,553,477, and the couplers capable of releasing a leuco dye as disclosed in Japanese Patent O.P.I. Publication No. 75547/1988.

Various couplers can be further used in the light-sensitive silver halide color photographic material according to the present invention. Examples thereof are described in RD17543 and RD308119 shown below. Related items described and paragraphs thereof are shown in the following.

| Items | Page of RD308119, | RD17643, | RD18716 |
|---|---|---|---|
| Yellow coupler | 1001 | Par. VII-D | Par. VII-C-G |
| Magenta coupler | 1001 | Par. VII-D | Par. VII-C-G |
| Cyan coupler | 1001 | Par. VII-D | Par. VII-C-G |
| DIR coupler | 1001 | Par. VII-F | Par. VII-F |
| BAR coupler | 1002 | Par. VII-F | |
| Other useful residual group releasing coupler | 1001 | Par. VII-F | |
| Alkali-soluble coupler | 1001 | Par. VII-E | |

The additives used in the light-sensitive silver halide color photographic material according to the present invention can be added by the dispersion method as disclosed in RD308119, paragraph XIV.

The support used in the light-sensitive silver halide color photographic material according to the present invention may include any supports. When a transparent support is used, a dye may preferably be incorporated in the support for the purpose of preventing the light piping phenomenon causing edge fog that occurs when light is made incident from a transparent support provided with a photographic emulsion layer. There are no particular limitations on the type of the dye incorporated for such purpose. In view of a process for the formation of films, dye with an excellent heat resistance is preferred, as exemplified by anthraquinone dyes. As a color tone of the transparent support, the support may preferably be dyed in gray as is seen in commonly available light-sensitive materials. One kind of dye may be used or two or more kinds of dyes may be used in combination. As the dyes, dyes such as SUMIPLAST (trade name; available from Sumitomo Chemical Co., Ltd.), DIARESIN (trade name; available from Mitsubishi Chemical Industries Limited) and MACROLEX (trade name; available from Bayer Japan Ltd.) may be used alone or in the form of a suitable mixture.

As the transparent support in the present invention, well known materials such as a triacetate film, polycarbonate film or polyester film can be used. Among them, polyester film is preferred. The polyester film can be prepared, for example, in the following way: A copolymer polyeser or a copolymer polyester composition containing this copolymer polyester and optionally mixed therewith an antioxidant or at least one selected from the group consisting of sodium acetate, sodium hydroxide and tetraethylhydroxyammonium is well dried and thereafter melt-extruded into a sheet through an extruder, a filter and a die, controlled within the temperature range of from 260° to 320° C., and the molten polymer extruded is cooled to solidify on a rotating cooling drum to give an unstretched film. Thereafter, the unstretched film is biaxially stretched in the longitudinal direction and in the lateral direction, followed by heat fixing.

Conditions for stretching the film may vary depending on the copolymer composition of the copolymer polyester, and can not be absolutely defined. The film may be stretched in the longitudinal direction within the temperature range of from the glass transition temperature (Tg) of the copolymer polyester to Tg+100° C. at a draw ratio of from 2.5 to 6.0 times and in the lateral direction within the temperature range of from TG+5° C. to TG+50° C. at a drew ratio of from 2.5 to 4.0 times. The biaxially stretched film thus obtained is usually heat-fixed at 150° C. to 240° C. and then cooled. Here, the film may be optionally relaxed in the longitudinal direction and/or lateral direction.

The transparent support in the present invention may be a single-layer film or sheet formed by the method as described above, or may have a double-layered structure in which a film made of other material and the film or sheet formed by the method as described above are laminated by coextrusion or lamination.

There are no particular limitations on the thickness of the transparent support in the present invention, thus obtained. In usual instances, it may be 120 μm or less, preferably from 40 to 120 μm, and more preferably from 50 to 110 μm. Any local non-uniformity in thickness of the transparent support may preferably be 5 μm or less, more preferably 4 μm or less, and particularly preferably 3 μm or less.

The transparent support having the thickness within the above range may cause no problem in the strength and curling tendency of the film on which photographic component layers have been provided by coating. The transparent support made to have a local thickness non-uniformity of 5 μm or less makes it possible to prevent occurrence of any coating uneveness or drying uneveness.

Subbing layer

The transparent support surface on which photographic component layers are formed may be optionally subjected to surface activation treatment such as corona discharging and/or provided with a subbing layer before the photographic component layers are formed.

This subbing layer may include, as preferred examples, the subbing layers as disclosed in Japanese Patent O.P.I. Publications No. 19941/1984, No. 77439/1984 and No. 22484/1984 and Japanese Patent Examined Publication No. 53029/1983. A subbing layer provided on the surface of the transparent support on the side opposite to the photographic component layer side is also called a back layer.

The light-sensitive silver halide color photographic material of the present invention may be provided also with a magnetic layer on which information is magnetically recorded.

The magnetic layer in the present invention may be the transparent magnetic layer as disclosed in Japanese Patent O.P.I. Publication No. 109604/1978, Japanese Patent Examined Publication No. 6575/1982, Japanese Patent O.P.I. Publication No. 45248/1985, U.S. Pat. No. 4,947,196, International Patent Publications No. 90/04254, No 91/11750, No 91/11816, No 92/08615 and No. 92/08225, etc., or the stripe type magnetic layer as disclosed in Japanese Patent O.P.I. Publications No. 124642/1992 and No. 124645/1992, etc.

In the case when the magnetic layer is a transparent layer, it may preferably have an optical density of 1.0 or less, more preferably 0.75 or less, and particularly preferably from 0.02 to 0.30.

Light-Sensitive Silver Halide Color Photographic Material

The light-sensitive silver halide color photographic material according to the present invention can be applied to various color photographic materials as typified by general-purpose or motion picture color negative films, slide or television color reversal films, color photographic papers, color positive films and color reversal photographic papers.

In the light-sensitive silver halide color photographic material according to the present invention, all the hydrophilic colloid layers on the side provided with emulsion layers may preferably have a total layer thickness of 24 μm or less, more preferably 20 μm or less, and still more preferably 18 μm or less. Their layer swelling rate $T_{\frac{1}{2}}$ may preferably be 30 seconds or less, and more preferably 20 seconds or less. The layer thickness refers to a layer thickness measured in a moisture-conditioned environment of 25° C. and 55% RH (2 days), and the layer swelling rate $T_{\frac{1}{2}}$ can be measured by a procedure known in the present technical field. For example, it can be measured using a swellometer of the type disclosed in A. Green et al., Photographic Science and Engineering, Vol. 19, No 2, pages 124–129. $T_{\frac{1}{2}}$ is defined to be the time by which the thickness reaches $\frac{1}{2}$ of a saturated layer thickness, wherein the saturated layer thickness corresponds to 90% of a maximum-swell layer thickness which reaches when processed in a color developing solution at 30° C. for 3 minutes and 15 seconds.

The layer swelling rate $T_{\frac{1}{2}}$ can be adjusted by adding a hardening agent to gelatin serving as a binder or by changing conditions with time after coating. The degree of swell may preferably be 150 to 400%. The degree of swell can be calculated by the expression: (maximum-swell layer thickness—layer thickness)/layer thickness, based on the maximum-swell layer thickness obtained under conditions stated above.

In the case when the light-sensitive silver halide color photographic material according to the present invention is used in the form of a roll, it may preferably take the form of a roll held in a cartridge. Cartridges most commonly used are film magazines of 135 format presently available. Besides, the cartriges proposed in the following patents can also be used.

Japanese Utility Model O.P.I. Publication No. 67329/1983, Japanese Patent O.P.I. Publication No. 181035/1983, Japanese Patent O.P.I. Publication No. 182534/1983, Japanese Utility Model O.P.I. Publication No. 19523/1983, U.S. Pat. No. 4,221,479, Japanese Patent O.P.I. Publication No. 231045/1989, Japanese Patent O.P.I. Publication No. 170155/1990, Japanese Patent O.P.I. Publication No. 205843/1990, Japanese Patent O.P.I. Publication No. 210346/1990, Japanese Patent O.P.I. Publication No. 199451/1990, Japanese Patent O.P.I. Publication No. 201441/1990, Japanese Patent O.P.I. Publication No. 214853/1990, Japanese Patent O.P.I. Publication No. 211443/1990, Japanese Patent O.P.I. Publication No. 264248/1989, Japanese Patent O.P.I. Publication No. 37646/1991, Japanese Patent O.P.I. Publication No. 37645/1991, Japanese Patent O.P.I. Publication No. 124564/1990, U.S. Pat. No. 4,846,418, U.S. Pat. No. 4,848,693 and U.S. Pat. No. 4,832,275.

The present invention can also be applied to "small-sized photographic roll film magazines and film cameras" described in Japanese Patent Application No. 16934/1992.

After exposure, the light-sensitive silver halide color photographic material according to the present invention can be subjected to color photographic processing by the conventional method as disclosed in the above RD17643, pages 28–29, RD18716, page 647, and RD308119, paragraph XIX.

On a negative film obtained by the photographic processing, recorded photographic information is read at an information reading zone, and the information thus read is utilized. The reading zone is comprised of a light-projecting section and a light-receiving section.

The light-projecting section is comprised of a control device, a driver, a light source such as a light-emitting diode and a lens system, from which light rays are shed on a photographic information recording zone of the negative film. The light rays shed thereon pass through the negative film and reach the light-receiving section. The light-receiving section is comprised, for example, of a selfoc lens array and a CCD line sensor. The information detected at a light-receiving face of the CCD line sensor is analyzed and recognized in the control device and recorded in its memory.

The information is taken out as occasion cells, and is utilized, e.g., to calculate conditions for photographic printing, to process information for reprinting and to control subsequent photographic processing steps in photofinishing laboratories.

EXAMPLES

Example 1

To 100 parts by weight of dimethyl terephthalate and 64 parts by weight of ethylene glycol, 0.1 part by weight of calcium acetate hydrate was added to carry out ester exchange reaction by a conventional method. To the resulting product, 28 parts by weight of an ethylene glycol solution of 5-sodium sulfo-di($\beta$-hydroxyethyl) isophthalate, 8 parts by weight of polyethylene glycol (number average molecular weight: 3,000), 0.05 part by weight of antimony trioxide, 0.13 part by weight of trimethyl phosphate and 0.02 part by weight of sodium hydroxide were added. Subsequently, the system was gradually brought into an elevated temperature and a reduce pressure to carry out polymerization at 280° C. and 0.5 mmHg. Thus, a polyester was obtained.

This polyester was vacuum-dried at 150° C., followed by melt-extrusion at 280° C. The extruded product was rapidly cooled to solidify on a cooling drum to produce an unstretched film. This unstretched film was stretch at 80° C. in the longitudinal direction by 3.3 times, and further stretched at 90° C. in the lateral direction by 3.3 times, followed by heat fixing for 30 seconds to give a biaxially stretched film with a thickness of 80 $\mu$m. Diethylene glycol was in a content of 4 mol %.

On both sides of this biaxially stretched film, subbing layers were provided in the following way.

A subbing layer coating solution comprised of 100 parts by weight of a subbing layer resin solution obtained by emulsion polymerization of the following composition, 0.2 part by weight of the following surface active agent, 0.3 part by weight of hexamethylene-1,6-bis(ethyleneurea) and 900 parts by weight of water was coated in a wet coating thickness of 20 $\mu$m each, followed by drying. In the following, the transparent support having the subbing layers is often merely called a transparent support.

| Composition | |
|---|---|
| 2-Hydroxyethyl methacrylate | 75 parts |
| Butyl acrylate | 90 parts |
| t-Butyl acrylate | 75 parts |
| Styrene | 60 parts |
| Sodium dodecylbenzenesulfonate | 6 parts |
| Ammonium persulfate | 1 part |
| Water | 700 parts |
| Surface active agent | |

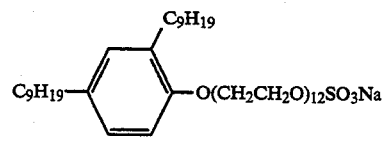

Next, a subbing layer coating solution comprised of 10 parts by weight of gelatin, 0.2 part by weight of saponin and 1,000 parts by weight of water was coated in a wet coating thickness of 20 $\mu$m, followed by drying.

On one side of the above support, the following magnetic layer was provided.

| Magnetic layer | |
|---|---|
| $\gamma$-Fe$_2$O$_3$ (coercive force: 330 Oe; specific surface area: 32 m$^2$/g) | 200 mg/m$^2$ |
| Gelatin | 3.0 mg/m$^2$ |
| Sodium di-(2-ethylhexyl)sulfosuccinate | 200 mg/m$^2$ |
| Bisvinylsulfonylmethane | 30 mg/m$^2$ |
| WAX-1 | 60 mg/m$^2$ |

Preparation of Light-Sensitive Silver Halide Color Photographic Material

Figure 3:
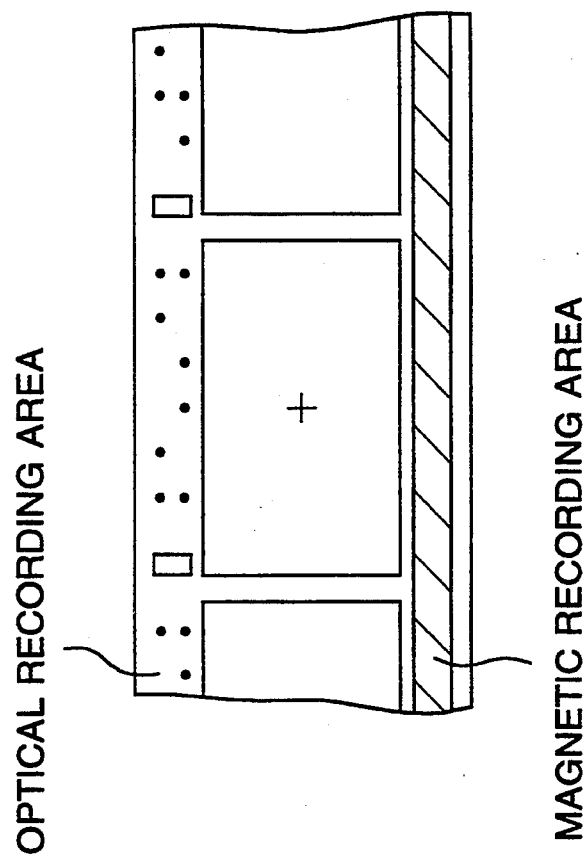
Figure 4:
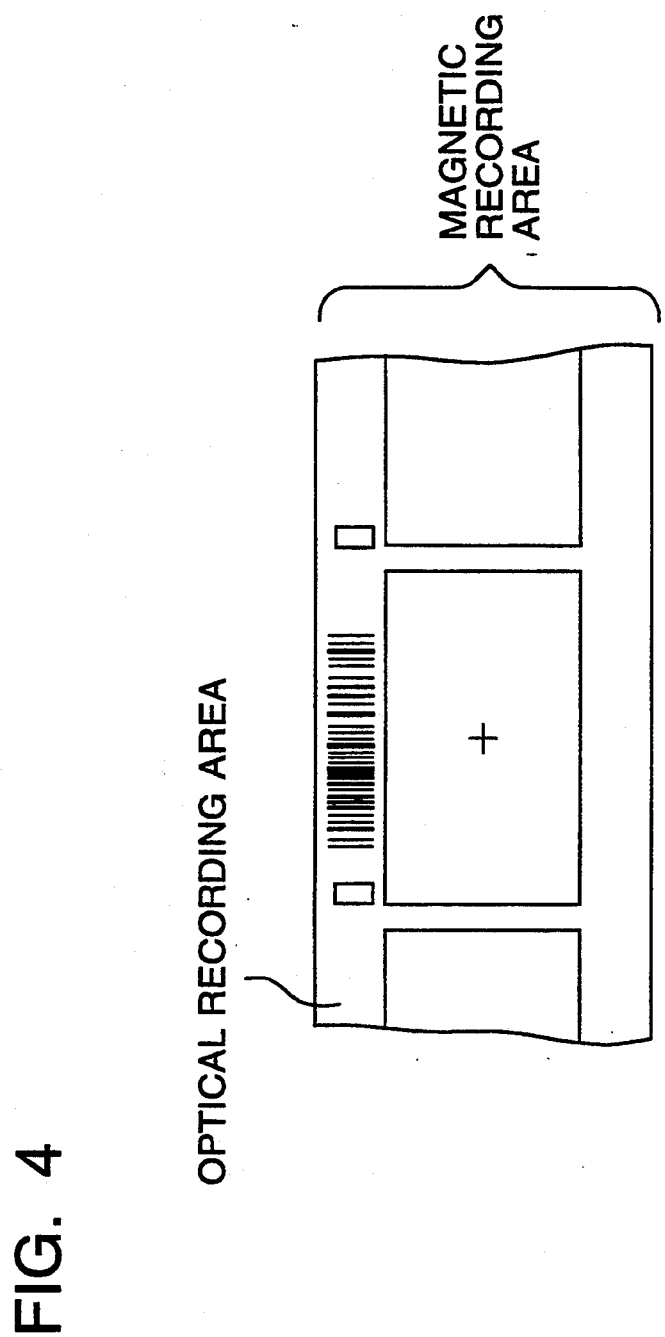
Figure 5:
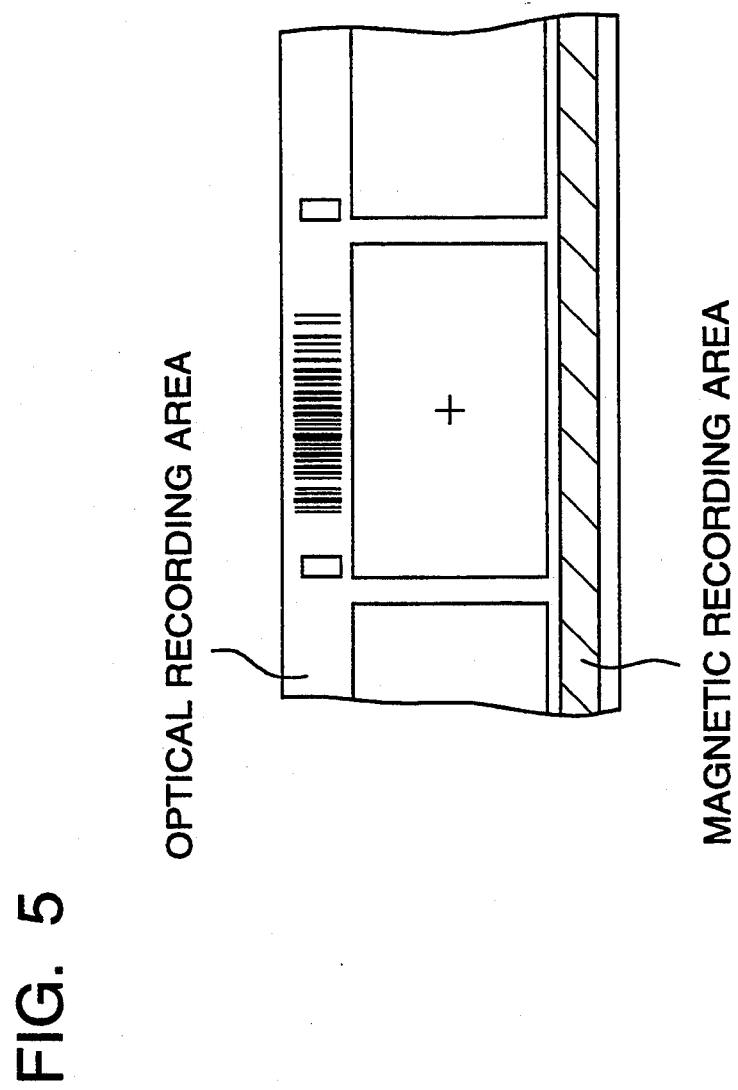
Figure 6:
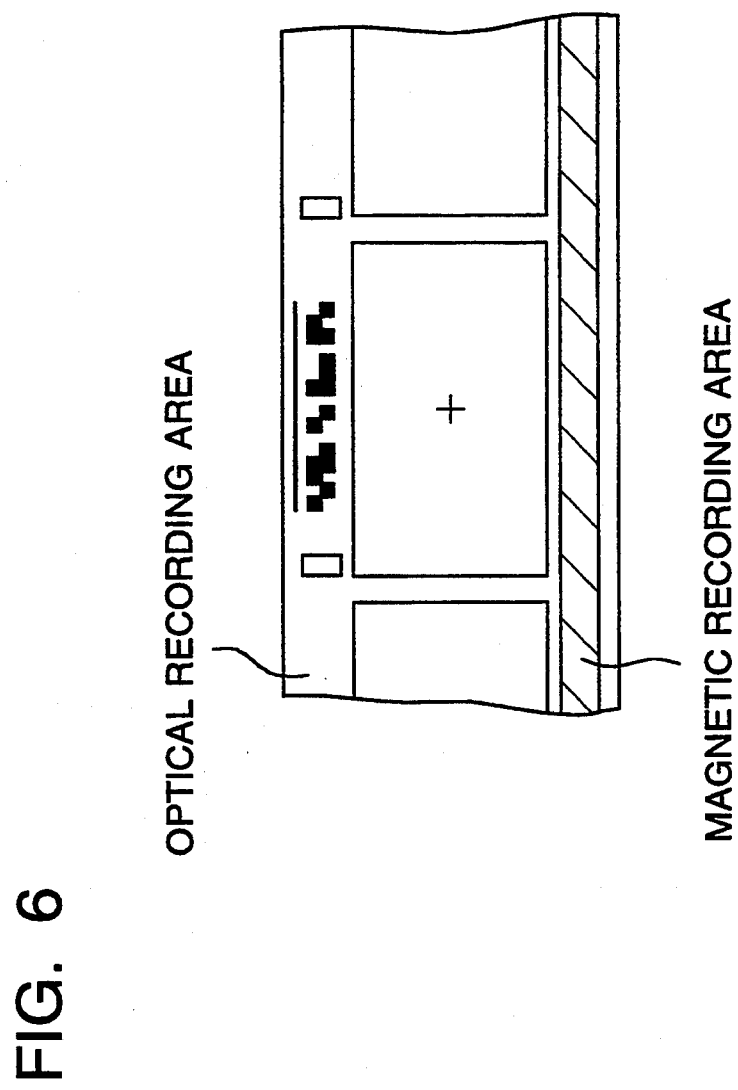
Figure 7:
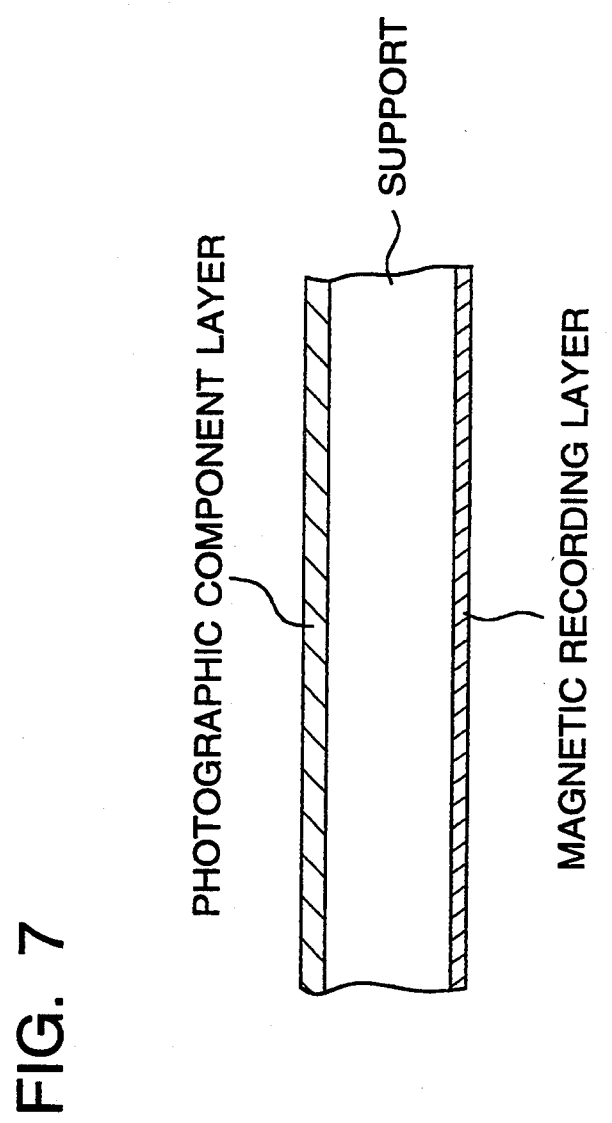
FIG. 7 is a schematic cross section of sample 101.

Layers composed as shown below were successively formed on the above transparent support. Thus, samples 101, a multi-layer color light-sensitive photographic material, was produced. FIG. 3 schematically illustrates a cross section of the sample 101.

Composition of Photographic Component Layers

In respect of silver halide and colloidal silver, the amount of coating is indicated as a unit of g/m$^2$ in terms of silver. In respect of couplers and additives, the amount of each compound added is indicated as a unit of g/m² gram per 1 m². In respect of spectral sensitizers, the amount is indicated as molar number per mol of silver in the same layer.

| Sample 101 | |
|---|---|
| First layer: Anti-halation layer | |
| Black colloidal silver | 0.16 |
| Ultraviolet absorbent UV-1 | 0.20 |
| High-boiling solvent Oil-1 | 0.20 |
| Gelatin | 1.23 |
| Second layer: Intermediate layer | |
| Compound SC-1 | 0.15 |
| High-boiling solvent Oil-2 | 0.17 |
| Gelatin | 1.27 |
| Third layer: Low-speed red-sensitive layer | |
| Silver iodobromide emulsion (average grain size: 0.38 μm; silver iodide content: 8.0 mol %) | 0.50 |
| Spectral sensitizer SD-1 | $2.8 \times 10^{-4}$ |
| Spectral sensitizer SD-2 | $1.9 \times 10^{-4}$ |
| Spectral sensitizer SD-3 | $1.9 \times 10^{-5}$ |
| Spectral sensitizer SD-4 | $1.0 \times 10^{-4}$ |
| Cyan coupler C-1 | 0.54 |
| Cyan coupler C-2 | 0.08 |
| Colored cyan coupler CC-1 | 0.021 |
| DIR compound D-2 | 0.020 |
| High-boiling solvent Oil-1 | 0.53 |
| Gelatin | 1.30 |
| Fourth layer: Medium-speed red-sensitive layer | |
| Silver iodobromide emulsion (average grain size: 0.52 μm; silver iodide content: 8.0 mol %) | 0.62 |
| Silver iodobromide emulsion (average grain size: 0.38 μm; silver iodide content: 8.0 mol %) | 0.27 |
| Spectral sensitizer SD-1 | $2.3 \times 10^{-4}$ |
| Spectral sensitizer SD-2 | $1.2 \times 10^{-4}$ |
| Spectral sensitizer SD-3 | $1.6 \times 10^{-5}$ |
| Spectral sensitizer SD-4 | $1.2 \times 10^{-4}$ |
| Cyan coupler C-1 | 0.25 |
| Cyan coupler C-2 | 0.08 |
| Colored cyan coupler CC-1 | 0.030 |
| DIR compound D-2 | 0.013 |
| High-boiling solvent Oil-1 | 0.30 |
| Gelatin | 0.93 |
| Fifth layer: High-speed red-sensitive layer | |
| Silver iodobromide emulsion (average grain size: 1.00 μm; silver iodide content: 8.0 mol %) | 1.27 |
| Spectral sensitizer SD-1 | $1.3 \times 10^{-4}$ |
| Spectral sensitizer SD-2 | $1.3 \times 10^{-4}$ |
| Spectral sensitizer SD-3 | $1.6 \times 10^{-5}$ |
| Cyan coupler C-1 | 0.12 |
| Colored cyan coupler CC-1 | 0.013 |
| High-boiling solvent Oil-1 | 0.14 |
| Gelatin | 0.91 |
| Sixth layer: Intermediate layer | |
| Compound SC-1 | 0.09 |
| High-boiling solvent Oil-2 | 0.11 |
| Gelatin | 0.80 |
| Seventh layer: Low-speed green-sensitive layer | |
| Silver iodobromide emulsion (average grain size: 0.38 μm; silver iodide content: 8.0 mol %) | 0.80 |
| Spectral sensitizer SD-4 | $7.4 \times 10^{-5}$ |
| Spectral sensitizer SD-5 | $6.6 \times 10^{-4}$ |
| Magenta coupler M-1 | 0.41 |
| Colored magenta coupler CM-2 | 0.12 |
| High-boiling solvent Oil-2 | 0.33 |
| Gelatin | 1.95 |
| Eighth layer: Medium-speed green-sensitive layer | |
| Silver iodobromide emulsion (average grain size: 0.52 μm; silver iodide content: 8.0 mol %) | 0.87 |
| Spectral sensitizer SD-5 | $2.4 \times 10^{-4}$ |
| Spectral sensitizer SD-6 | $2.4 \times 10^{-4}$ |
| Magenta coupler M-2 | 0.12 |
| Colored magenta coupler CM-2 | 0.070 |
| DIR compound D-2 | 0.025 |

-continued

| Sample 101 | |
|---|---|
| DIR compound D-3 | 0.002 |
| High-boiling solvent Oil-2 | 0.10 |
| Gelatin | 1.00 |
| Ninth layer: High-speed green-sensitive layer | |
| Silver iodobromide emulsion (average grain size: 1.0 μm; silver iodide content: 8.0 mol %) | 1.27 |
| Spectral sensitizer SD-5 | $1.4 \times 10^{-4}$ |
| Spectral sensitizer SD-6 | $1.4 \times 10^{-4}$ |
| Magenta coupler M-2 | 0.10 |
| Colored magenta coupler CM-1 | 0.012 |
| High-boiling solvent Oil-2 | 0.10 |
| Gelatin | 1.00 |
| Tenth layer: Yellow filter layer | |
| Yellow colloidal silver | 0.08 |
| Color stain preventive agent SC-1 | 0.15 |
| Formalin scavenger HS-1 | 0.20 |
| High-boiling solvent Oil-2 | 0.19 |
| Gelatin | 1.10 |
| Eleventh layer: Intermediate layer | |
| Formalin scavenger HS-1 | 0.20 |
| Gelatin | 0.60 |
| Twelfth layer: Low-speed blue-sensitive layer | |
| Silver iodobromide emulsion (average grain size: 0.38 μm; silver iodide content: 8.0 mol %) | 0.22 |
| Silver iodobromide emulsion (average grain size: 0.27 μm; silver iodide content: 2.0 mol %) | 0.03 |
| Spectral sensitizer SD-7 | $4.2 \times 10^{-4}$ |
| Spectral sensitizer SD-8 | $6.8 \times 10^{-5}$ |
| Yellow coupler Y-1 | 0.75 |
| DIR compound D-1 | 0.010 |
| High-boiling solvent Oil-2 | 0.30 |
| Gelatin | 1.20 |
| Thirteenth layer: Medium-speed blue-sensitive layer | |
| Silver iodobromide emulsion (average grain size: 0.59 μm; silver iodide content: 8.0 mol %) | 0.30 |
| Spectral sensitizer SD-7 | $1.6 \times 10^{-4}$ |
| Spectral sensitizer SD-8 | $7.2 \times 10^{-5}$ |
| Yellow coupler Y-1 | 0.10 |
| DIR compound D-1 | 0.010 |
| High-boiling solvent Oil-2 | 0.046 |
| Gelatin | 0.47 |
| Fourteenth layer: High-speed blue-sensitive layer | |
| Silver iodobromide emulsion (average grain size: 1.00 μm; silver iodide content: 8.0 mol %) | 0.85 |
| Spectral sensitizer SD-7 | $7.3 \times 10^{-5}$ |
| Spectral sensitizer SD-8 | $2.8 \times 10^{-5}$ |
| Yellow coupler Y-1 | 0.11 |
| High-boiling solvent Oil-2 | 0.046 |
| Gelatin | 0.80 |
| Fifteenth layer: First protective layer | |
| Silver iodobromide (average grain size: 0.08 μm; silver iodide content: 1.0 mol %) | 0.40 |
| Ultraviolet absorbent UV-1 | 0.026 |
| Ultraviolet absorbent UV-2 | 0.013 |
| High-boiling solvent Oil-1 | 0.07 |
| High-boiling solvent Oil-3 | 0.07 |
| Formalin scavenger HS-1 | 0.40 |
| Gelatin | 1.31 |
| Sixteenth layer: Second protective layer | |
| Alkali-soluble matting agent (average particle diameter: 2 μm) | 0.15 |
| Polymethyl methacrylate (average particle diameter: 3 μm) | 0.04 |
| Lubricant WAX-1 | 0.04 |
| Gelatin | 0.55 |

The above light-sensitive material further contains compounds Su-1 and Su-2, a thickener, hardening agents H-1 and H-2, stabilizer ST-1, antifoggants AF-1, and AF-2 (in two kinds with Mw 10,000 end Mw 1,100,000), Dyes AI-1 and AI-2, and compound DI-1 (9.4 mg/m²).
Structures of the above UV-1, Oil-1, SC-1, Oil-2, SD-1, SD-2, SD-3, SD-4, C-1, C-2, CO-1, D-1, D-2, M-1, M-2, CM-1, D-3, CM-2, SC-2, HS-1, SD-5, Y-1, SD-5, SD-7, SD-8, UV-2, WAX-1, SU-1, Su-2, H-1, H-2, ST-1, AF-2, AI-1, AI-2 and compound DI-1 are shown below.
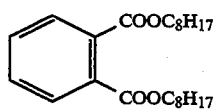 Oil-1
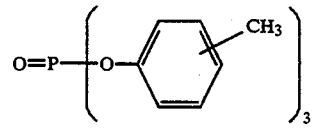 Oil-2
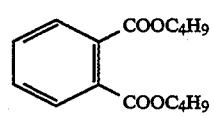 Oil-3
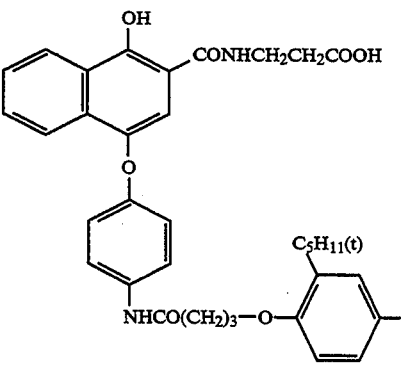 SC-1
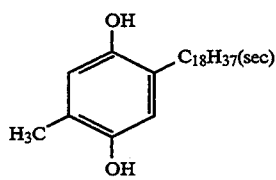 SC-2
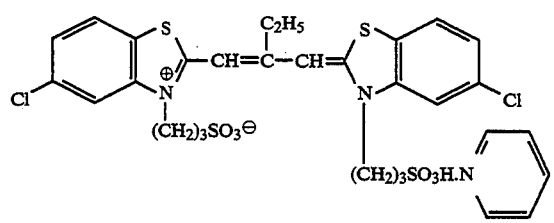 SD-1
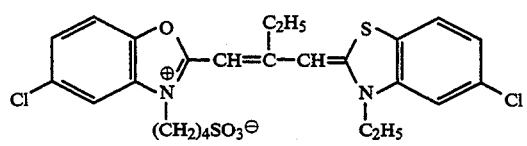 SD-2
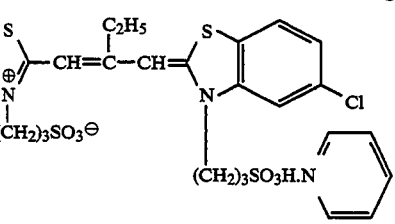 SD-3
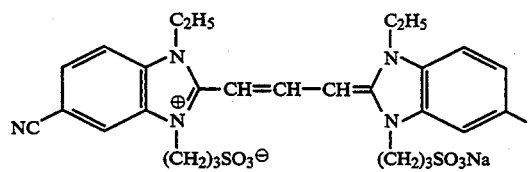 SD-4
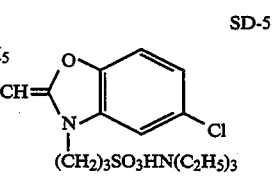 SD-5
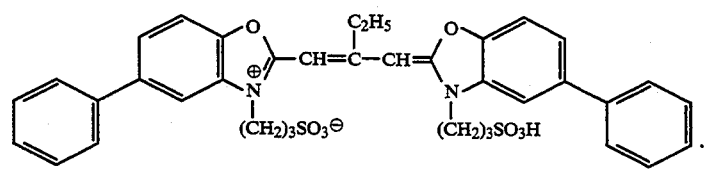 SD-6
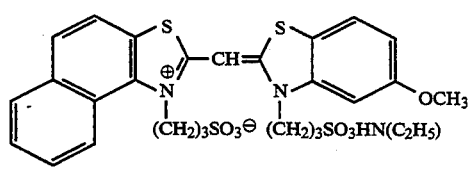 SD-7

-continued
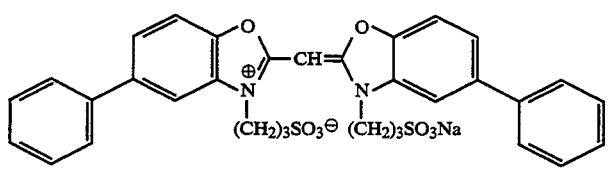
SD-8
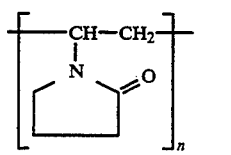
AF-2
n: Degree of polymerization
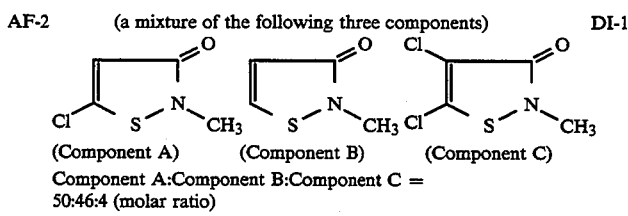
DI-1 (a mixture of the following three components)
Component A:Component B:Component C = 50:46:4 (molar ratio)
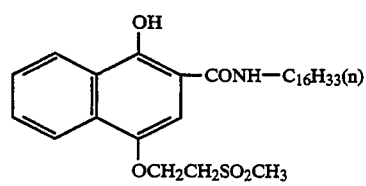
C-1
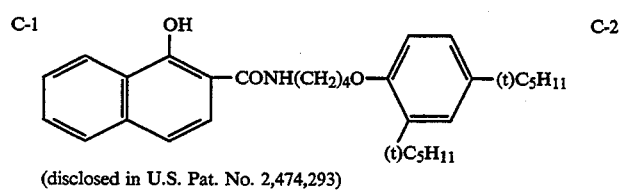
C-2
(disclosed in U.S. Pat. No. 2,474,293)
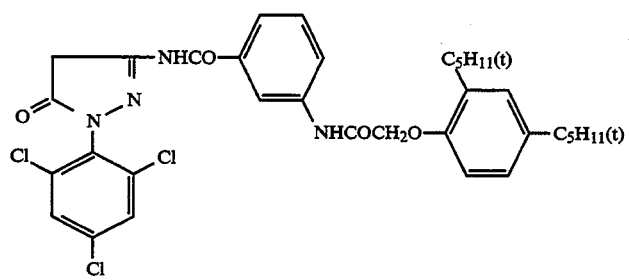
M-1
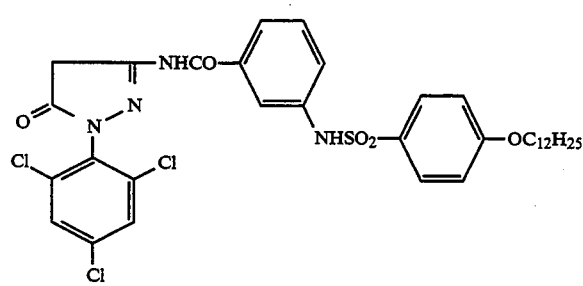
M-2
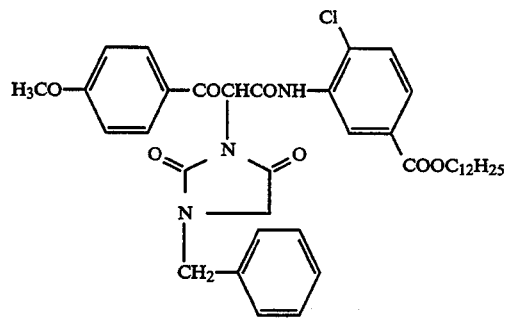
Y-1
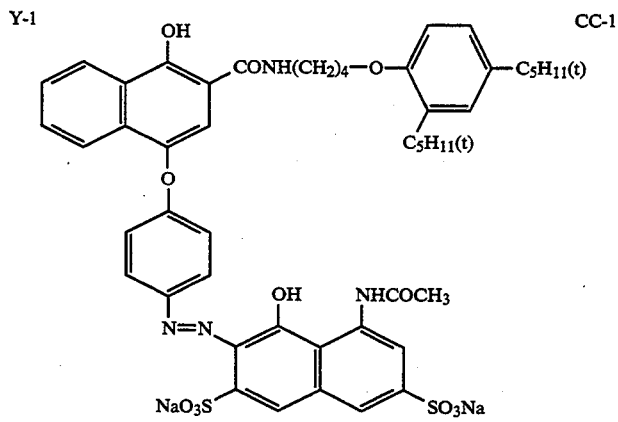
CC-1

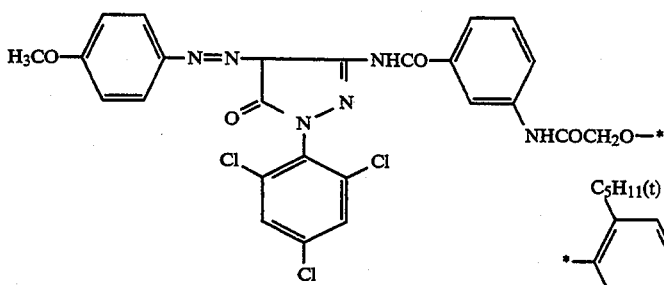
CM-1
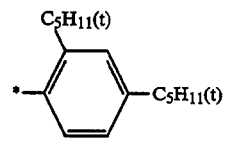
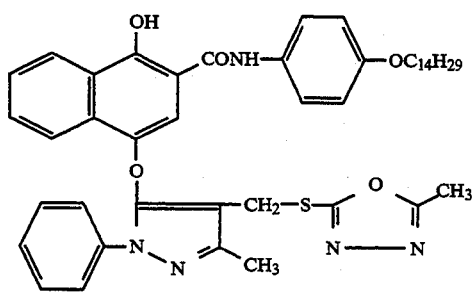
D-1
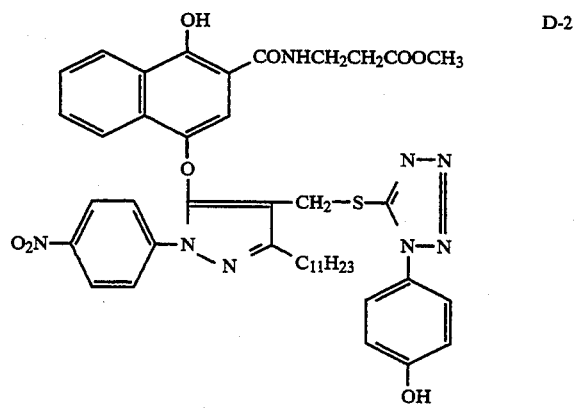
D-2
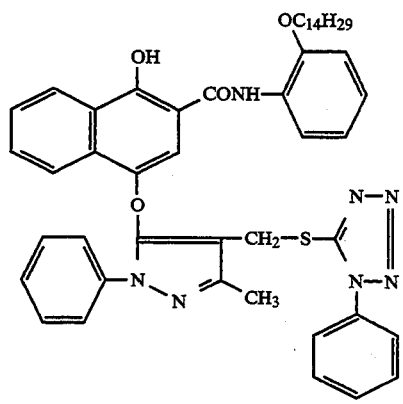
D-3
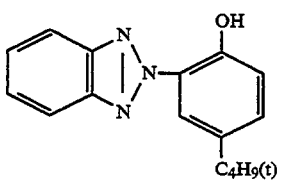
UV-1
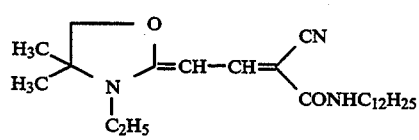
UV-2
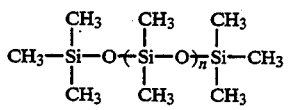
WAX-1
Weight average molecular weight Mw: 3,000
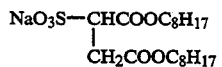
Su-1
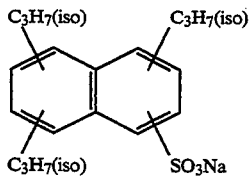
Su-2
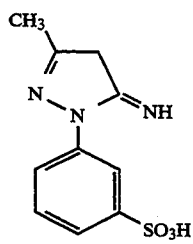
HS-1
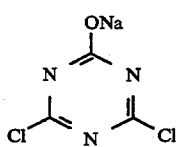
H-1
(CH₂=CHSO₂CH₂)₂O  H-2

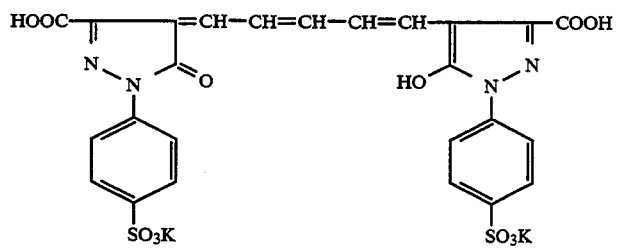

AI-1

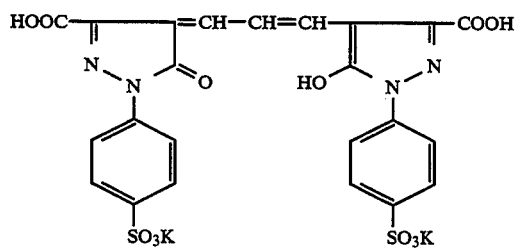

AI-2

Samples 102 to 112 were produced in the same manner as the sample 101 except that the cyan couplers C-1 in its third, fourth and fifth layers were replaced with equimolar amounts of the couplers shown in Table 1.

TABLE 1

| Sample No. | Cyan coupler |
| --- | --- |
| 101 | C-1 (comparative) |
| 102 | C-2 (comparative) |
| 103 | C-3 (comparative) |
| 104 | C-4 (comparative) |
| 105 | C-5 (comparative) |
| 106 | C-6 (comparative) |
| 107 | CU-4 |
| 108 | CU-6 |
| 109 | CU-13 |
| 110 | CU-40 |
| 111 | CU-47 |
| 112 | CU-53 |

Structures of the comparative couplers are shown below.

Structures of C-1 and C-2 are as shown previously.

Comparative coupler C-3 (disclosed in U.S. Pat. No. 2,698,794)

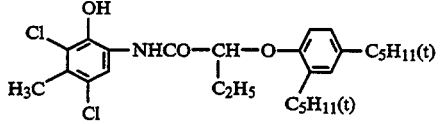

Comparative coupler C-4 (disclosed in U.S. Pat. No. 2,772,162)

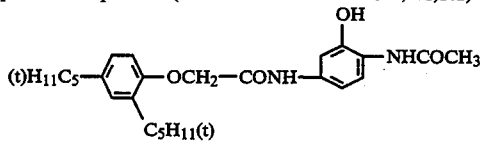

Comparative coupler C-5 (disclosed in Japanese Patent O.P.I. Publication No. 109630/1978)

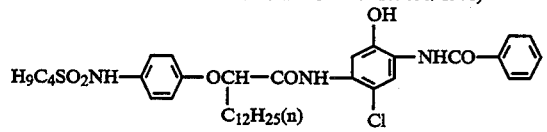

Comparative coupler C-6 (disclosed in Japanese Patent O.P.I. Publication No. 53643/1986)

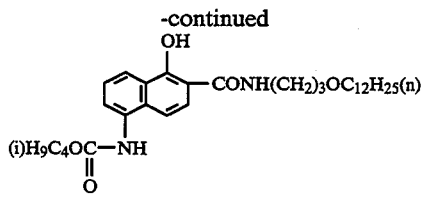

Evaluation

The following tests were made on the supposition of a severe condition in which photographic films were handled in the market.

(1) Samples 101 to 112 were each cut in a standard of usual 135 size, 24 exposures, end were set in film magazines, which were then tightly enclosed in a polypropylene airtight container in an environment of 25° C. and 55% RH.

In the state the samples were kept in the airtight container, they were left to stand in an environment of 50° C. and 80% RH for 3 days. Next, they were left to stand in a −20° C. refrigerator for 2 days, and thereafter restored to e room-temperature condition in a day.

Figure 2:
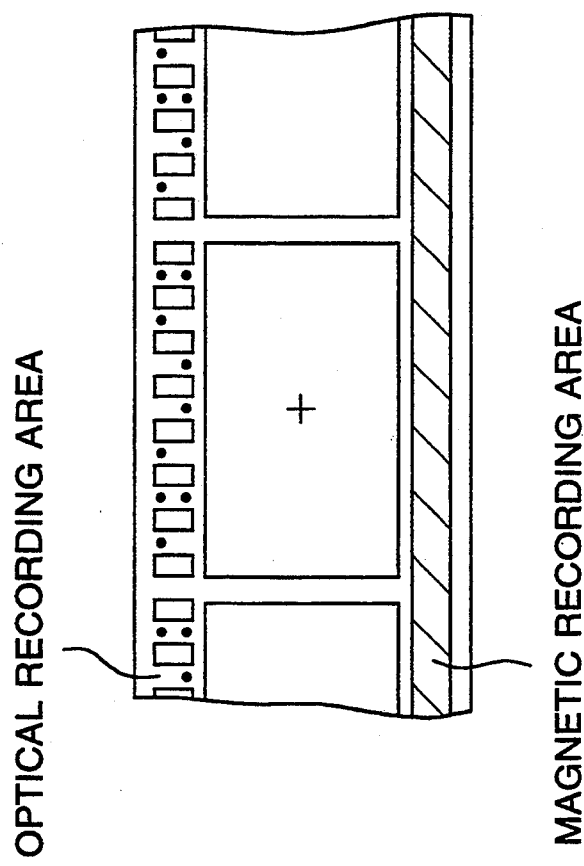
FIGS. 2 to 6 are each a schematic illustration of a film on which information has been optically recorded with dot-matrix, FIGS. 2-3, bar-cord, FIG. 3-4, and CALRA code, FIG. 5-6.

(2) Photographing and optical recording:

Using the above samples, a test pattern was photographed and optical recording (FIG. 2) through a light-emitting diode was carried out by means of a camera as shown in FIG. 1, with a built-in light-emitting diode 1 (GeAsP) having an emission peek at 655 nm, and magnetic recording head 2.

(3) Photographic processing:

The samples were each photographically processed under the following conditions.

| Processing step | Time | Temperature (°C.) | Amount of replenishment (cc) |
| --- | --- | --- | --- |
| Color developing | 3 min 15 sec | 38 ± 0.3 | 780 |
| Bleaching | 6 min 30 sec | 38 ± 2.0 | 150 |
| Washing | 3 min 15 sec | 20 ± 10 | 200 |
| Fixing | 6 min 30 sec | 38 ± 2.0 | 830 |
| Washing | 3 min 15 sec | 20 ± 10 | 200 |
| Stabilizing | 1 min 30 sec | 38 ± 5.0 | 830 |

-continued

| Processing step | Time | Temperature (°C.) | Amount of replenishment (cc) |
|---|---|---|---|
| Drying | 2 min | 55 ± 5.0 | — |

The amount of replenishment is indicated as a value per 1 m² of the light-sensitive photographic material.

As a color developing solution, a bleaching solution, a fixing solution, stabilizing solution and replenishing solutions thereof, those prepared in the following way were used.

| Color developing solution | |
|---|---|
| 4-Amino-3-methyl-N-ethyl-N(β-hydroxyethyl)aniline sulfate | 4.75 g |
| Anhydrous sodium sulfite | 4.25 g |
| Hydroxylamine ½ sulfate | 2.0 g |
| Anhydrous potassium carbonate | 37.5 g |
| Sodium bromide | 1.3 g |
| Trisodium nitrilotriacetate (monohydrate) | 2.5 g |
| Potassium hydroxide | 1.0 g |
| Made up to 1 liter by adding water, and adjusted to pH 10.1. | |
| Bleaching solution | |
| Ferric ammonium ethylenediaminetetraacetate | 100 g |
| Diammonium ethylenediaminetetraacetate | 10.0 g |
| Ammonium bromide | 150 g |
| Glacial acetic acid | 10 ml |
| Made up to 1 liter by adding water, and adjusted to pH 6.0 using ammonia water. | |
| Fixing solution | |
| Ammonium thiosulfate | 175 g |
| Anhydrous sodium sulfite | 8.5 g |
| Sodium metabisulfite | 2.3 g |
| Made up to 1 liter by adding water, and adjusted to pH 6.0 using acetic acid. | |
| Stabilizing solution | |
| Formalin (aqueous 37% solution) | 1.5 ml |
| KONIDAX (trade name; available from Konica Corporation) | 7.5 ml |
| Made up to 1 liter by adding water. | |
| Color developing replenishing solution | |
| Water | 800 ml |
| Potassium carbonate | 35 g |
| Sodium hydrogencarbonate | 3 g |
| Potassium sulfite | 5 g |
| Sodium bromide | 0.4 g |
| Hydroxylamine sulfate | 3.1 g |
| 4-Amino-3-methyl-N-ethyl-N(β-hydroxyethyl)aniline sulfate | 6.3 g |
| Potassium hydroxide | 2 g |
| Diethylenetriaminepentaacetic acid | 3.0 g |
| Made up to 1 liter by adding water, and adjusted to pH 10.18 using potassium hydroxide or 20% sulfuric acid. | |
| Bleaching replenishing solution | |
| Water | 700 ml |
| Ferric ammonium ⅓ diaminopropanetetraacetate | 175 g |
| Ethylenediaminetetraacetic acid | 2 g |
| Sodium nitrate | 50 g |
| Ammonium bromide | 200 g |
| Glacial acetic acid | 56 g |
| Made up to 1 liter by adding water after adjusted to pH 4.0 using ammonia water or glacial acetic acid. | |
| Fixing replenishing solution | |
| Water | 800 ml |
| Ammonium thiocyanate | 150 g |
| Ammonium thiosulfate | 180 g |
| Sodium sulfite | 20 g |
| Ethylenediaminetetraacetic acid | 2 g |
| Made up to 1 liter by adding water after adjusted to pH 6.5 using ammonia water or glacial acetic acid. | |
| Stabilizing replenishing solution | |

The same as the stabilizing solution.

The samples having been photographically processed were each left to stand in an environment of 50° C. and 65% RH for 5 days.

(4) Optically recorded information reading test:

Information recorded on the samples was read 10 times for each sample by means of an optically recorded information reader employing the same light-emitting diode as used in the camera shown in FIG. 1. Results of error frequency thereon are shown in Table 2 in percentage.

TABLE 2

| Sample No. | Error frequency (%) | Remarks |
|---|---|---|
| 101 | 1.8 | Comparative Example |
| 102 | 2.0 | Comparative Example |
| 103 | 3.4 | Comparative Example |
| 104 | 1.5 | Comparative Example |
| 105 | 1.2 | Comparative Example |
| 106 | 1.7 | Comparative Example |
| 107 | 0.0 | Present Invention |
| 108 | 0.1 | Present Invention |
| 109 | 0.1 | Present Invention |
| 110 | 0.0 | Present Invention |
| 111 | 0.1 | Present Invention |
| 112 | 0.0 | Present Invention |

As is seen from Table 2, in optically recording photographed information by means of a red light-emitting diode and reading the information after photographic processing, read errors can be decreased only when the coupler of the present invention is used in the film.

Thus, the present invention makes it possible to decrease the occurrence of read errors of optically recorded photographic information.

What is claimed is:

1. A method for photographically recording information comprising the steps of writing an information pattern at an area outside of a picture taking area of a silver halide color photographic film having a red-sensitive silver halide emulsion layer by red-light emitted from a light-emitting diode with an emission maximum wavelength of 620 nm or more, processing said color photographic film, and optically reading said information pattern formed on said color photographic film with red-light having a maximum intensity wavelength within the range of 650 nm to 700 nm, wherein, said red-sensitive silver halide emulsion layer contains a coupler represented by the following Formula CU:

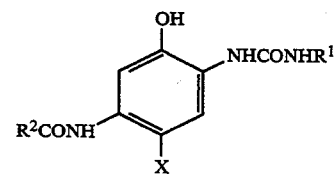

wherein X is a substituent capable of splitting-off upon reaction with the oxidation product of an aromatic primary amine color developing agent; $R^1$ is an aryl group or a heterocyclic group; $R^2$ is an aliphatic group or an aryl group; and the above groups represented by $R^1$ or $R^2$ each may have a substituent.

2. The method of claim 1, wherein said light-emission diode has an emission maximum wavelength the range of from 650 nm to 700 nm.

3. The method of claim 1, wherein said writing by red light is carried out from the light-sensitive layer side of the photographic film.

4. The method of claim 1, wherein a red-light source used for reading-out said information pattern is a red light-emission diode.

5. The method of claim 1, wherein said substituent of the group represented by $R^1$ or $R^2$ are each a chlorine atom, a nitro group, a cyano group, an alkyl group, an aryl group, an amino group, a hydroxyl group, an acyl group an alkoxycarbonyl group, an aryloxycarbonyl group, an alkylsulfonyl group, an arylsulfonyl group, an alkoxycarbonyl group, an aryloxysulfonyl group, a carbamyl group, a sulfamoyl group, an acyloxy group, a carbonamido group or a sulfonamido group.

6. The method of claim 5, wherein said substituent of the group represented by $R^1$ is a halogen atom, an alkylsulfonyl group, or a cyano group.

7. The method of claim 5, wherein said substituent of the group represented by $R^2$ is a group represented by the following Formula CU-II:

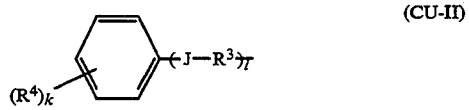

wherein J is an oxygen atom or a sulfur atom; $R^3$ is an alkenyl group; $R^4$ is a substituent and K is an integer of 0 to 4 and 1 is 0 or 1.

8. The method of claim 1, wherein said red-sensitive emulsion layer contains said coupler in an amount of from $1.0 \times 10^{-3}$ moles to 1.0 mole per mole of silver contained in said red-sensitive emulsion layer.

9. The method of claim 1, wherein said color photographic film has a red-sensitive emulsion layer containing a coupler represented by Formula CU, a green-sensitive emulsion layer containing a magenta coupler and a blue-sensitive emulsion layer containing a yellow coupler.

* * * * *

UNITED STATES PATENT AND TRADEMARK OFFICE
CERTIFICATE OF CORRECTION

PATENT NO. : 5,376,484
DATED : December 27, 1994
INVENTOR(S) : Masaru IWAGAKI et al It is certified that error appears in the above-indentified patent and that said Letters Patent is hereby corrected as shown below:

Claim 5, column 43, line 15 after "group"
(first occurrence) insert --,--; and
line 19 change "carbamyl"
to --carbamoyl--.

Signed and Sealed this

Sixth Day of June, 1995

*Attest:*

BRUCE LEHMAN

*Attesting Officer*  *Commissioner of Patents and Trademarks*